(12) United States Patent
Une et al.

(10) Patent No.: US 10,924,620 B2
(45) Date of Patent: Feb. 16, 2021

(54) DOCUMENT READING GUIDANCE FOR OPERATOR USING FEATURE AMOUNT ACQUIRED FROM IMAGE OF PARTIAL AREA OF DOCUMENT

(71) Applicant: FUJI XEROX CO., LTD., Tokyo (JP)

(72) Inventors: Kiyoshi Une, Kanagawa (JP); Nagamasa Misu, Kanagawa (JP); Ryosuke Tsuji, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 70 days.

(21) Appl. No.: 15/976,973

(22) Filed: May 11, 2018

(65) Prior Publication Data

US 2018/0343350 A1 Nov. 29, 2018

(30) Foreign Application Priority Data

May 26, 2017 (JP) .............................. JP2017-104988
Jun. 26, 2017 (JP) .............................. JP2017-124062

(51) Int. Cl.
*H04N 1/00* (2006.01)
*H04N 1/387* (2006.01)
(Continued)

(52) U.S. Cl.
CPC ....... *H04N 1/0066* (2013.01); *G06K 9/00442* (2013.01); *G06K 9/00463* (2013.01);
(Continued)

(58) Field of Classification Search
CPC ... H04N 1/0044–00461; H04N 1/0066; H04N 1/00684–00721; H04N 1/00724; H04N 1/00726; H04N 1/00758; H04N 1/00771–00782; H04N 1/00801–00809; H04N 1/00811; H04N 1/00816; H04N 1/00824; H04N 1/04; H04N 1/10; H04N 1/047; H04N 1/40062; H04N 1/6072; G06F 3/1256; G06K 9/00442; G06K 9/00456; G06K 9/00463; G06T 7/13; G06T 7/30; G06T 7/33
See application file for complete search history.

(56) References Cited

U.S. PATENT DOCUMENTS 6,215,914 B1   4/2001  Nakamura et al.
6,859,287 B1 * 2/2005  Frederiksen ......... G03G 15/605
                                                        358/1.12
(Continued)

FOREIGN PATENT DOCUMENTS

JP    H11-015951 A    1/1999
JP    2009-100099 A   5/2009

*Primary Examiner* — Scott A Rogers
(74) *Attorney, Agent, or Firm* — Oliff PLC

(57) ABSTRACT

A reading method guidance apparatus includes a receiving unit, an acquisition unit, and a guidance unit. The receiving unit receives a document size that is a size of a document as a reading target. The acquisition unit acquires an image of at least a partial area in the document. The guidance unit provides an operator with guidance about a reading procedure when the document is read by a first reading apparatus in plural batches, using a feature amount obtained from the acquired image, the received document size, and a readable size that is a size of an area readable by the first reading apparatus.

29 Claims, 20 Drawing Sheets

(51) Int. Cl.
  *G06T 7/33* (2017.01)
  *G06K 9/00* (2006.01)
  *H04N 1/40* (2006.01)
  *H04N 1/60* (2006.01)
  *G06T 7/13* (2017.01)

(52) U.S. Cl.
  CPC .................. *G06T 7/13* (2017.01); *G06T 7/33* (2017.01); *H04N 1/0044* (2013.01); *H04N 1/00708* (2013.01); *H04N 1/00771* (2013.01); *H04N 1/00806* (2013.01); *H04N 1/00809* (2013.01); *H04N 1/00811* (2013.01); *H04N 1/00816* (2013.01); *H04N 1/00824* (2013.01); *H04N 1/3876* (2013.01); *H04N 1/40062* (2013.01); *H04N 1/6072* (2013.01); *H04N 1/00411* (2013.01); *H04N 2201/043* (2013.01); *H04N 2201/0414* (2013.01); *H04N 2201/0416* (2013.01)

(56) References Cited

U.S. PATENT DOCUMENTS

| | | | | |
|---|---|---|---|---|
| 8,390,831 | B2* | 3/2013 | Nozaki | H04N 1/00236 358/1.1 |
| 8,861,042 | B2* | 10/2014 | Ishida | H04N 1/0044 358/474 |
| 9,794,478 | B2* | 10/2017 | Matsumoto | H04N 5/23238 |
| 2012/0120099 | A1* | 5/2012 | Ishizuka | G06T 11/60 345/620 |
| 2018/0367688 | A1* | 12/2018 | Yellapragada | H04N 1/00713 |
| 2018/0367689 | A1* | 12/2018 | Yellapragada | G06K 9/3258 |
| 2020/0137233 | A1* | 4/2020 | Wilson | H04N 1/00721 |
| 2020/0162630 | A1* | 5/2020 | Arifuku | H04N 1/00013 |

* cited by examiner

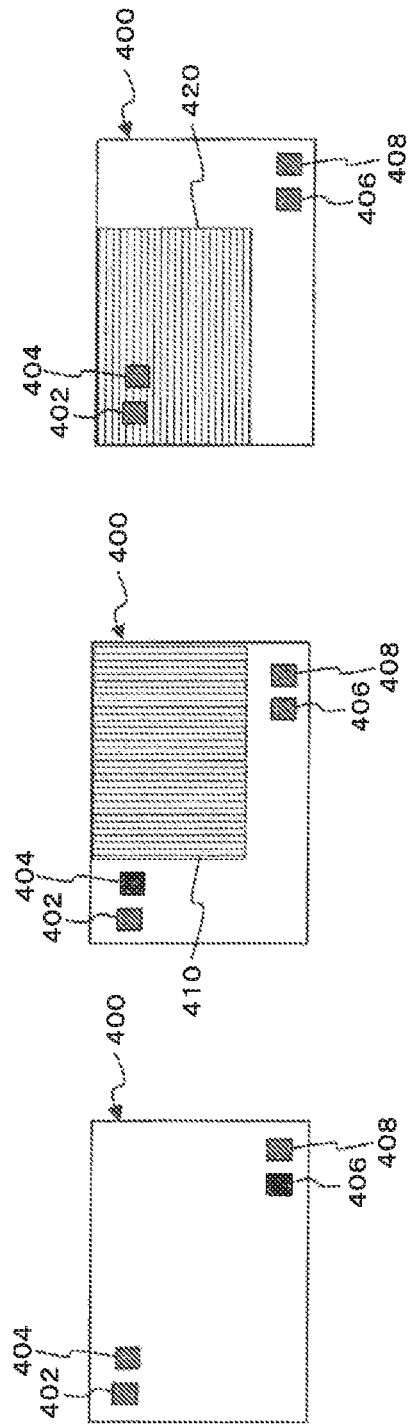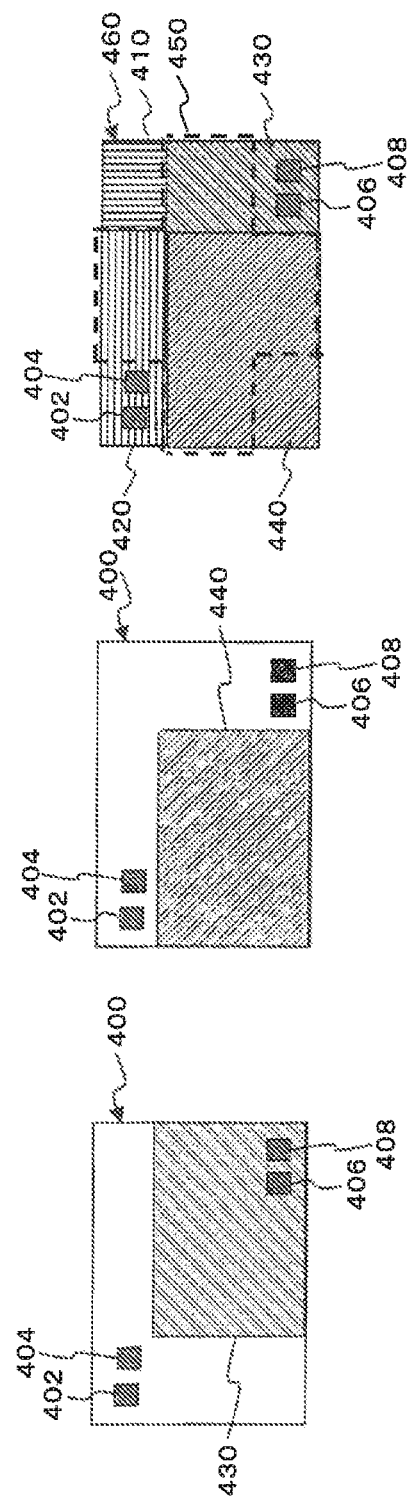

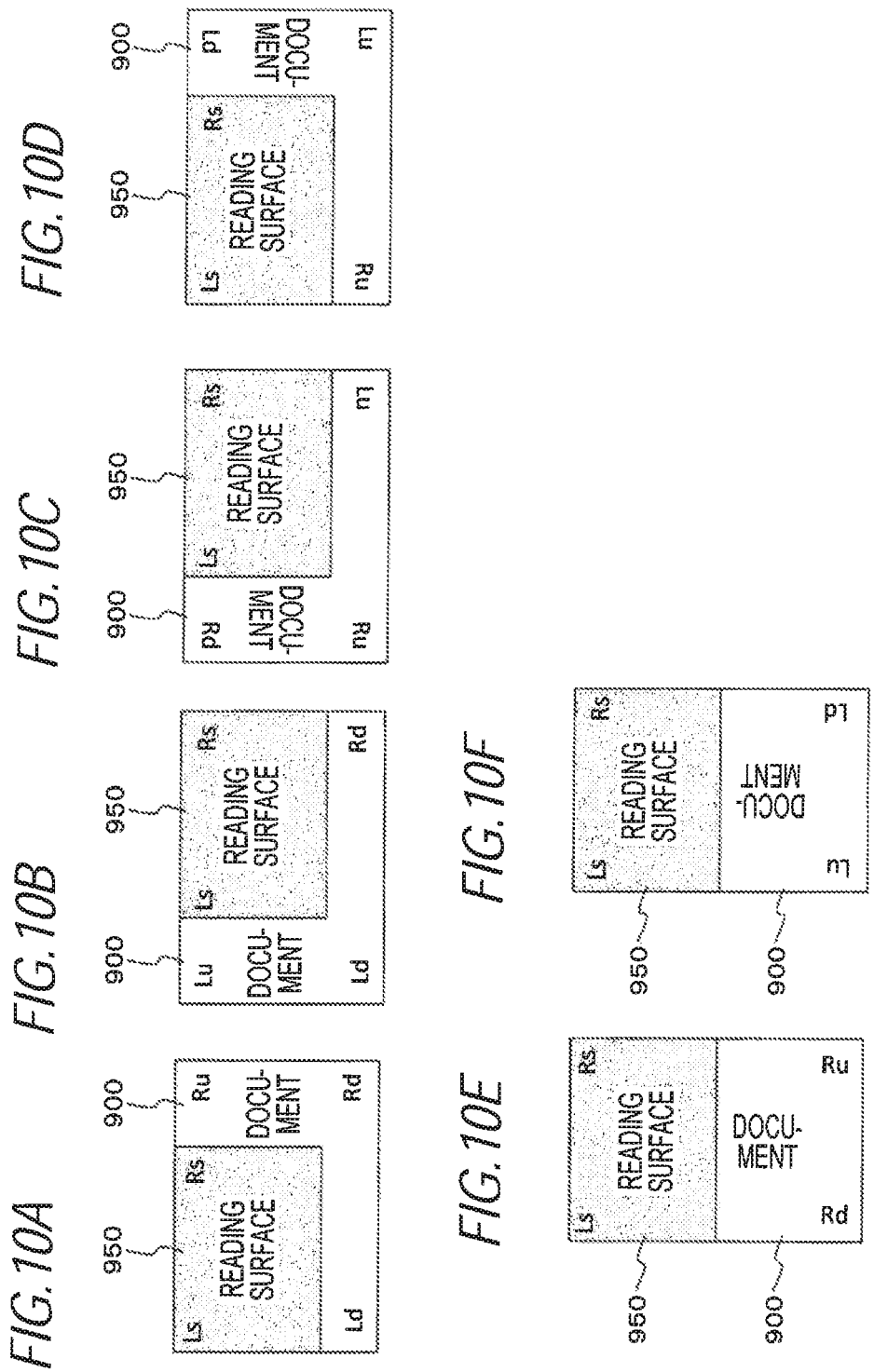

FIG.11A

|  | AREA | | | | | | | | |
|---|---|---|---|---|---|---|---|---|---|
|  | A | B | C | D | E | F | G | H | I |
| PLACEMENT METHOD 1 | ○ | ○ |  | ○ | ○ |  |  |  |  |
| PLACEMENT METHOD 2 |  | ○ | ○ |  | ○ | ○ |  |  |  |
| PLACEMENT METHOD 3 |  |  |  | ○ | ○ |  | ○ | ○ |  |
| PLACEMENT METHOD 4 |  |  |  |  | ○ | ○ |  | ○ | ○ |
| PLACEMENT METHOD 5 | ○ | △ |  | ○ | △ |  | ○ | △ |  |
| PLACEMENT METHOD 6 |  | △ | ○ |  | △ | ○ |  | △ | ○ |

| (A) | (B) | (C) |
|---|---|---|
| (D) | (E) | (F) |
| (G) | (H) | (I) |

1150

DOCUMENT READING GUIDANCE FOR OPERATOR USING FEATURE AMOUNT ACQUIRED FROM IMAGE OF PARTIAL AREA OF DOCUMENT

CROSS-REFERENCE TO RELATED APPLICATIONS

This application is based on and claims priority under 35 USC 119 from Japanese Patent Application Nos. 2017-104988 filed May 26, 2017 and 2017-124062 filed Jun. 26, 2017.

BACKGROUND

Technical Field

The present invention relates to a reading method guidance apparatus, a non-transitory computer readable medium, and an image processing system.

SUMMARY

According to an aspect of the invention, a reading method guidance apparatus includes a receiving unit, an acquisition unit, and a guidance unit. The receiving unit receives a document size that is a size of a document as a reading target. The acquisition unit acquires an image of at least a partial area in the document. The guidance unit provides an operator with guidance about a reading procedure when the document is read by a first reading apparatus in plural batches, using a feature amount obtained from the acquired image, the received document size, and a readable size that is a size of an area readable by the first reading apparatus.

BRIEF DESCRIPTION OF THE DRAWINGS

Exemplary embodiments of the present invention will be described in detail based on the following figures, wherein:

FIGS. 4A to 4F are explanatory views illustrating an example of a procedure of reading a document larger than a readable size;

FIGS. 10A to 10F are explanatory views illustrating a process example according to the exemplary embodiment;

FIGS. 11A and 11B are explanatory views illustrating a data structure example of an area and placement method correspondence table;

DETAILED DESCRIPTION

Hereinafter, an exemplary embodiment suitable for implementing the present invention will be described with reference to the drawings.

Figure 1:
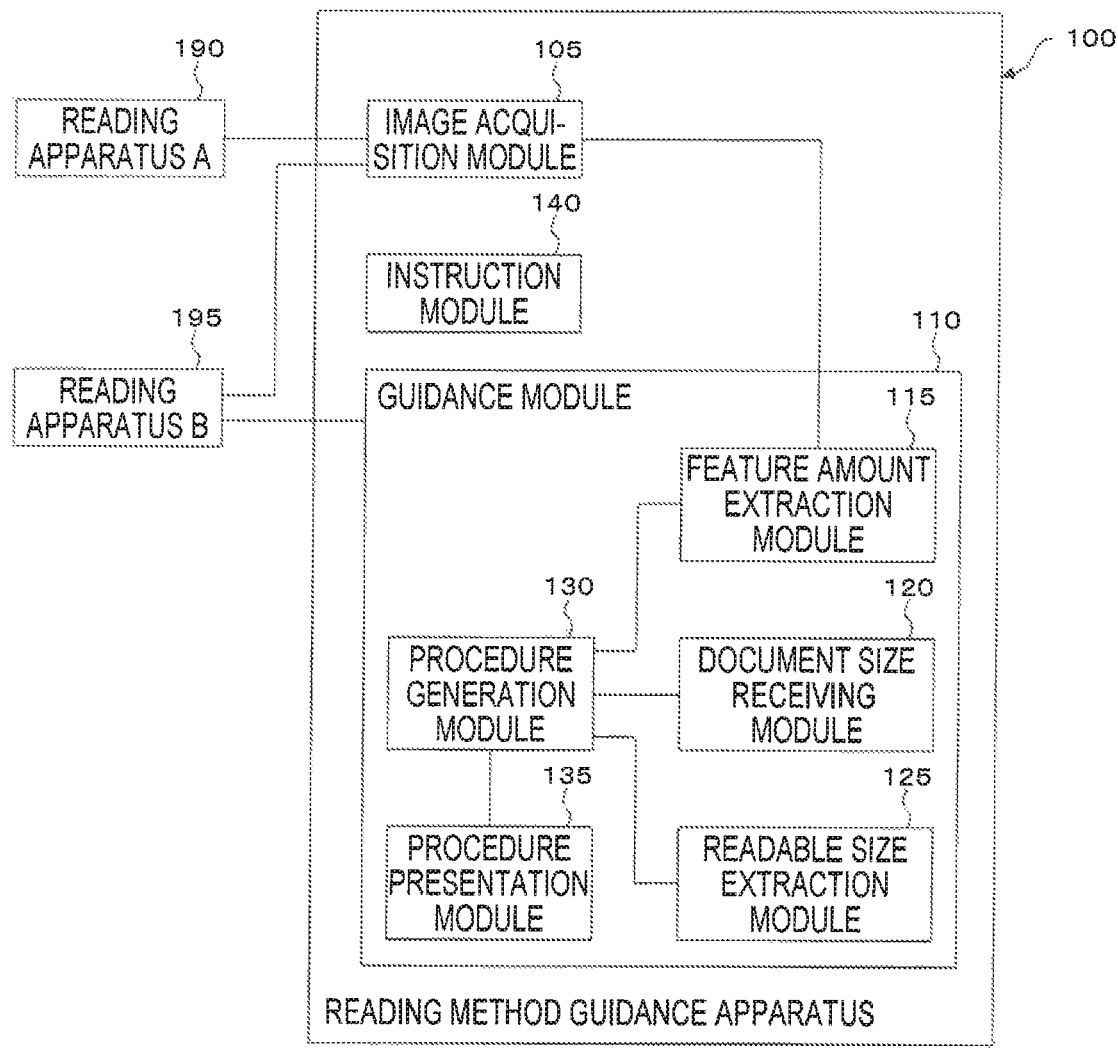
FIG. 1 is a conceptual module configuration diagram concerning a configuration example according to an exemplary embodiment.

FIG. 1 illustrates a conceptual module configuration diagram concerning a configuration example of the exemplary embodiment.

A module generally refers to a logically separable component such as software (a computer program) or hardware. Accordingly, the module in the exemplary embodiment refers to not only a module in the computer program, but also a module in a hardware configuration. Therefore, the exemplary embodiment also describes a computer program (a program causing a computer to execute respective procedures, a program causing a computer to function as respective units, and a program causing a computer to implement respective functions), a system and a method, which may serve as the modules. Meanwhile, for the convenience of explanation, "to store", "to be stored" and equivalent wordings are used. When the exemplary embodiment relates to a computer program, these wordings mean that the computer program is stored or controlled to be stored in a storage device. The modules may correspond to functions in a one-to-one relationship. Meanwhile, in implementation, one module may be implemented by one program, plural modules may be implemented by one program, and conversely, one module may be implemented by plural programs. The plural modules may be executed by one computer, or one module may be executed by plural computers in a distributed or parallel environment. One module may include another module. Hereinafter, a term "connection" is used for a case of not only a physical connection, but also a logical connection (a data exchange, an instruction, a reference relationship between data and the like). The term "predetermined" indicates that things are determined prior to a target process, and is used with the meaning that things are determined in accordance with a situation/state at that time or a situation/state until then as long as a target process is not yet performed before a process according to the exemplary embodiment starts or even after the process according to the exemplary embodiment starts. When there are plural "predetermined values," the values may be different from each other, or two or more values (of course, including all the values) may be the same as each other. In addition, the description "when it is A, B is performed" indicates that "it is determined whether it is A, and if it is determined that it is A, B is performed," except for a case where it is unnecessary to make the determination as to whether it is A. Enumeration of things such as "A, B, and C" indicates exemplary enumeration unless otherwise mentioned, which includes a case where only one (e.g., only A) is selected.

A configuration of a system or an apparatus may be implemented not only through connection between plural computers, hardware, apparatuses, and the like via a communication unit such as a network (including a one-to-one correspondence communication connection), but also through one computer, one hardware, one apparatus, and the like. An "apparatus" and a "system" are used synonymously with each other. Of course, the "system" does not include a system that is merely a social "structure" (a social system) as an artificial arrangement.

Each process in each module or each of plural processes in a case where the plural processes are performed in the module, target information is read from a storage device, and a process result is written in the storage device after the process is performed. Accordingly, descriptions for reading from a storage device prior a process, and writing to the storage device after the process may be omitted. In addition, a storage device herein may include a hard disk, a random access memory (RAM), an external storage medium, a storage device via a communication line, a register within a central processing unit (CPU), and the like.

A reading method guidance apparatus 100 according to the exemplary embodiment presents guidance for causing a reading apparatus to read a document having a size larger than an area readable by the reading apparatus in plural batches. As illustrated in the example of FIG. 1, the reading method guidance apparatus 100 includes an image acquisition module 105, a guidance module 110, and an instruction module 140. Here, a "document having a size larger than an area readable by a reading apparatus" corresponds to, for example, an A3 size document in the case where a reading size of a scanner is an A4 size. In such a case, it is impossible to acquire an image of the entire document through one reading (also called scanning), and thus, plural readings are required. Then, the read images are synthesized and the image with an original size (an A3 size in the above described example) is generated. Due to this synthesis process, a reading procedure may vary according to a feature amount in a document image. The reading method guidance apparatus 100 presents the reading procedure.

Hereinafter, in describing the exemplary embodiment, terms will be defined.

A "size" refers to a combination of a length of a long side and a length of a short side when a rectangularization process is performed on a document or a readable area (when an area itself before subjected the rectangularization process is rectangular, the rectangularization process may not be necessary). The "size" is not determined only by a length of either a long side or a short side or an area of a rectangle. A statement that "a size A is larger than a size B" indicates that both a length of a long side and a length of a short side in the size A are larger than those in the size B. For example, there are an A3 size, an A4 size, a B4 size, a B5 size, and the like defined by International Standards, the Japanese Industrial Standards, or the like.

A "readable size" refers to a size of a readable area.

A "read image" refers to an image obtained through single reading.

A "synthesized image" refers to an image obtained by synthesizing read images.

A "feature amount (of an image)" refers to an amount indicating a feature in an image, and indicates, for example, physical quantities of color parameters (such as brightness, saturation, and hue), a degree of change in each physical quantity or the like. More specifically, the feature amount may include an edge amount (an amount of portions where a brightness or the like of an image is discontinuously converted), a histogram (a distribution of a density value), a character recognition result (including a character code, information indicating whether or not a character is recognizable (e.g., a value indicating an accuracy of the character recognition result) and the like), or a combination thereof. In general, from the results obtained by analyzing these, it is possible to grasp various characteristics of an image such as a character or a photograph, an edge portion, and a blank portion.

A reading apparatus A 190 is connected to the image acquisition module 105 of the reading method guidance apparatus 100. The reading apparatus A 190 reads at least a partial area in a document. Unlike a reading apparatus B 195, the reading apparatus A 190 has a lower reading accuracy than the reading apparatus B 195. The reading apparatus A 190 may be, for example, a portable digital camera, a portable information device including a digital camera (including a cellular phone, a smart phone, a mobile device, a wearable computer or the like), or the like. Accordingly, when a document is read by the reading apparatus A 190, a distortion or the like may often occur compared to that in the reading apparatus B 195. The image read by the reading apparatus A 190 is an image as a pre-scan, but not an image used for finally performing a synthesis. Here, "at least a partial area in a document" may include the entire document. At least a partial area may not include the entire document, but only has to include a characteristic area in the document. Here, the "characteristic area" refers to a portion usable for alignment of image synthesis, and an area where a feature amount is locally largely changed.

The reading apparatus B 195 is connected to the image acquisition module 105 and the guidance module 110 of the reading method guidance apparatus 100. The reading apparatus B 195 reads at least a partial area in a document. The reading apparatus B 195 may correspond to, for example, a scanner, a multifunction machine having a function of a scanner (an image processing apparatus having functions of a printer, a copier, a facsimile, etc. in addition to the scanner function), or the like. A readable size that is a size of an area readable by the reading apparatus B 195 is fixed. This is because a reading surface where a document is placed (generally, called a document table, a document glass, or the like) is fixed. An image read by the reading apparatus B 195 is an image used for finally performing a synthesis, or may be an image as a pre-scan. Here, in an "image as a pre-scan," a characteristic area in a document only has to be included in a readable area. When the image is used as the image as a pre-scan, the function of the reading apparatus A 190 is replaced by the reading apparatus B 195, and the reading apparatus A 190 becomes unnecessary.

The image acquisition module 105 is connected to a feature amount extraction module 115 of the guidance module 110, the reading apparatus A 190, and the reading apparatus B 195. The image acquisition module 105 acquires an image of at least a partial area in a document from the reading apparatus A 190 or the reading apparatus B 195. The image acquisition module 105 may be connected to either one or both of the reading apparatus A 190 and the reading apparatus B 195. Then, when the image of at least a partial area in a document is acquired from the reading apparatus A 190, the "at least a partial area in a document" may include the entire document. This corresponds to an image as a pre-scan. Meanwhile, as long as a characteristic area in a document is included in an image, instead of the entire document, the partial area of the document may be included. The image acquired from the reading apparatus B 195 is an image having a readable size of the reading apparatus B 195.

The guidance module 110 includes the feature amount extraction module 115, a document size receiving module 120, a readable size extraction module 125, a procedure generation module 130, and a procedure presentation module 135, and is connected to the reading apparatus B 195, and the image acquisition module 105.

The feature amount extraction module 115 is connected to the image acquisition module 105 and the procedure generation module 130. The feature amount extraction module 115 extracts features used for extracting a portion usable in alignment in the image synthesis, from an image as a pre-scan (an image read by the reading apparatus A 190 or the reading apparatus B 195, especially, the entire image read by the reading apparatus A 190 is suitable).

The document size receiving module 120 is connected to the procedure generation module 130. The document size receiving module 120 receives a document size that is a size of a document as a reading target. For example, the document size receiving module 120 may control a liquid crystal display serving as a touch panel so as to receive an operation of a size designation by an operator may. Further, a document size may be received through an operation (including a gaze, a gesture, a voice or the like) of the operator using a mouse, a keyboard, a camera, a microphone, or the like. When the size of a document to be read is fixed, a predetermined document size may be received.

The readable size extraction module 125 is connected to the procedure generation module 130. The readable size extraction module 125 extracts a readable size that is a size of an area readable by the reading apparatus B 195. For example, the readable size extraction module 125 may communicate with the reading apparatus B 195 and acquire the readable size of the reading apparatus B 195 through an inquiry. The readable size of the reading apparatus B 195 may be extracted using a reading apparatus and readable size correspondence table 700 illustrated in the example of FIG. 7.

The procedure generation module 130 is connected to the feature amount extraction module 115, the document size receiving module 120, the readable size extraction module 125, and the procedure presentation module 135. The procedure generation module 130 generates a reading procedure when a target document is read by the reading apparatus B 195 in plural batches, using a feature amount obtained from an image acquired by the image acquisition module 105 (a feature amount extracted by the feature amount extraction module 115), a document size received by the document size receiving module 120, and a readable size that is a size of an area readable by the reading apparatus B 195 (a readable size extracted by the readable size extraction module 125).

The reading procedure may include one or more of following items:

(1) at the time of each reading, an instruction as to which area on each document is to be read by the reading apparatus B 195;

(2) at the time of each reading, an instruction as to at which position or in which orientation each document is to be placed on the reading apparatus B 195;

(3) an instruction on the number of times a document is to be read; and (4) after reading at least once or more, an instruction as to whether further reading is required.

The procedure generation module 130 may generate a reading procedure that provides guidance as to which area of the document is to be read in each reading such that an area in which a feature amount is locally largely changed on a document is included in reading areas at the time of reading at least twice or more.

In such a case, the procedure generation module 130 may select reading patterns whose areas in which a feature amount is locally largely changed overlap, among the plural reading patterns in which reading areas overlap each other, for each document size.

For each reading pattern, (i) which area of the document is an area to be read plural times and (ii) which area is an area to be read once may be specified.

The procedure generation module 130 may change the number of times of reading according to a position of an area in which a feature amount is locally largely changed.

The procedure generation module 130 may generate a reading procedure such that when there are plural areas in which a feature amount is locally largely changed in a document, the plural areas are included in an overlapping area.

The procedure generation module 130 may generate a reading procedure that provides guidance as to which area of the document is to be read in each reading such that an area in which a feature amount is locally minutely changed on a document is not included in reading areas at the time of reading at least twice or more.

The procedure generation module 130 may generate a reading procedure that provides guidance as to which area of the document is to be read in each reading such that reading areas at the time of plural readings do not overlap each other with using an area in which a feature amount is locally minutely changed in the document as a boundary. Here, the statement "not overlapping each other" is synonymous with a reduction of an overlapping portion.

Then, when a document size is an integer multiple of a readable size, the procedure generation module 130 may specify an area that may become a joint, and may check whether or not a feature amount is locally minutely changed around the area. Here, the statement that the "document size is an integer multiple of a readable size" indicates that the area size is an integer multiple, which corresponds to the case where, for example, the document size is an A3 size, and the readable size is an A4 size.

Further, the procedure generation module 130 may check the joint area after reading is performed an integer number of times.

The procedure generation module 130 may check the area of the joint after the reading, and generate a reading procedure that provides guidance to end the reading when the feature amount is minutely changed.

The procedure generation module 130 may check the area of the joint after the reading, and generate a reading procedure that provides guidance to prompt next reading when the feature amount is changed largely.

The procedure generation module 130 may generate a reading procedure that provides guidance such that (i) the next reading includes at least a part of an already read area and (ii) an area including a portion in which the feature amount is locally largely changed becomes a reading area in the part.

Figure 18:
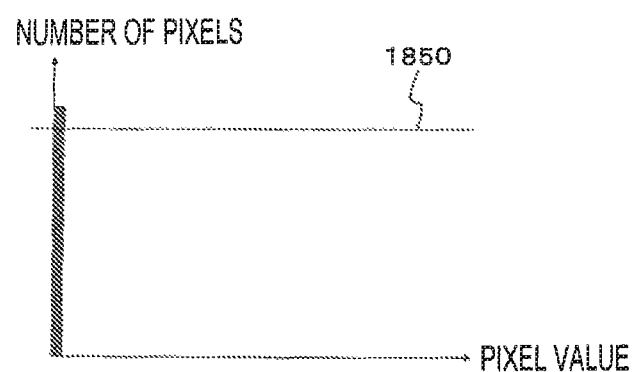
FIG. 18 is an explanatory view illustrating a process example according to the exemplary embodiment.

In the checking of these, a determination may be made based on an edge amount in a coupling direction, a histogram, a character recognition result, or a combination thereof. For example, when the edge amount is a predetermined threshold value or more, a corresponding area is determined as an area having a large feature amount change. For example, in the character recognition result, when the number of objects that are not recognizable as characters (for example, the number of objects that are not recognizable as characters in a case where only a part of characters become as targets of character recognition) is a predetermined threshold value or more, a corresponding area may be determined as an area having a large feature amount change. When the character recognition result is blank (a recognition result that there is no character), a corresponding area may be determined as an area having a minute feature amount change. The determination using a histogram will be described below with reference to the example in FIGS. 18 and 19.

Then, when a document size is not an integer multiple of a readable size, the procedure generation module 130 may generate a reading procedure that provides guidance as to which area of the document is to be read in each reading such that an overlapping reading area at the time of plural readings becomes smaller. Here, the statement that the "document size is not an integer multiple of a readable size" indicates that the area size is not an integer multiple, which corresponds to the case where, for example, the document size is a B4 size, and the readable size is an A4 size.

Then, the procedure generation module 130 may check whether or not an area in which a feature amount is locally minutely changed is included in the overlapping reading area.

Further, the procedure generation module 130 may check the area of the joint after the reading, and generate a reading procedure that provides guidance to end a reading when an area in which a feature amount is locally minutely changed is included.

The procedure generation module 130 may generate a reading procedure that provides guidance to prompt next reading when an area in which a feature amount is locally minutely changed is not included.

The procedure generation module 130 may generate a reading procedure that provides guidance such that (i) the next reading includes at least a part of an already read area and (ii) an area including a portion in which the feature amount is locally largely changed becomes a reading area in the part.

In the checking of these, a determination may be made based on an edge amount in a coupling direction, a histogram, a character recognition result, or a combination thereof.

The procedure presentation module 135 is connected to the procedure generation module 130. The procedure presentation module 135 presents a reading procedure generated by the procedure generation module 130. Here, the presentation may include an output as a three-dimensional (3D) image as well as a display on a display device such as a liquid crystal display, and further include a combination of an output of a sound through a sound output device (such as a speaker), a vibration, and a printing by a printing device such as a printer, etc.

The instruction module 140 instructs an operator to read a document using the reading apparatus A 190 or the reading apparatus B 195 prior to the guidance by the procedure presentation module 135. This corresponds to an instruction of a so-called pre-scan.

Then, when the reading is performed by the reading apparatus B 195, the image acquisition module 105 acquires an image of at least a partial area on the document from the result of reading based on the instruction by the instruction module 140.

When the reading is performed by the reading apparatus B 195, the instruction module 140 may instruct the operator to read a document using the reading apparatus B 195 such that a characteristic area in the document falls within a readable area.

When the reading is performed by the reading apparatus A 190, the image acquisition module 105 may receive the result obtained after the entire area in the document is read by the reading apparatus A 190, and then acquire an image of at least a partial area on the document. As described above, in this case, "an image of at least a partial area in a document" is an image of the entire area in the document.

Figure 2A:
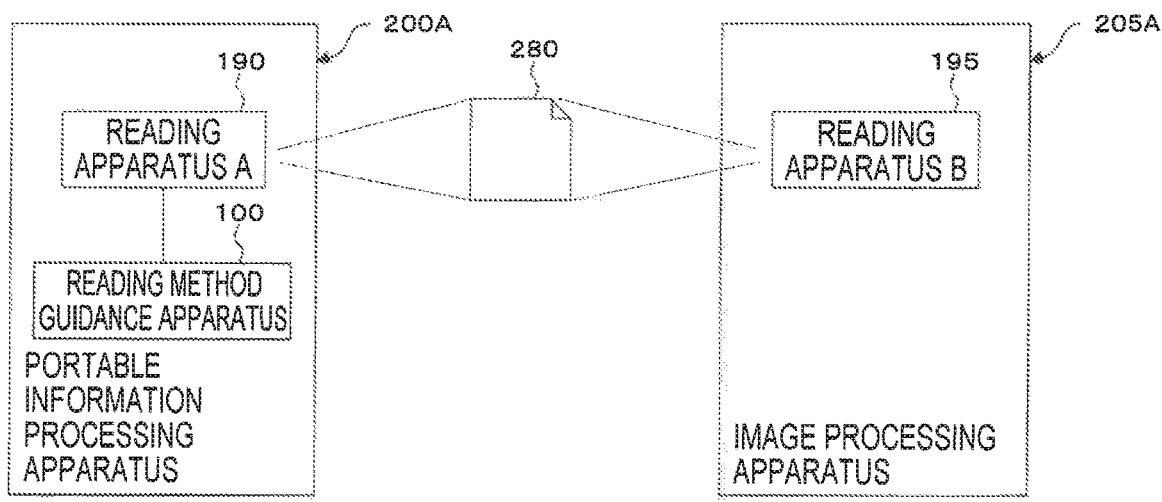
FIGS. 2A and 2B are explanatory views illustrating a system configuration example according to the exemplary embodiment.
Figure 2B:
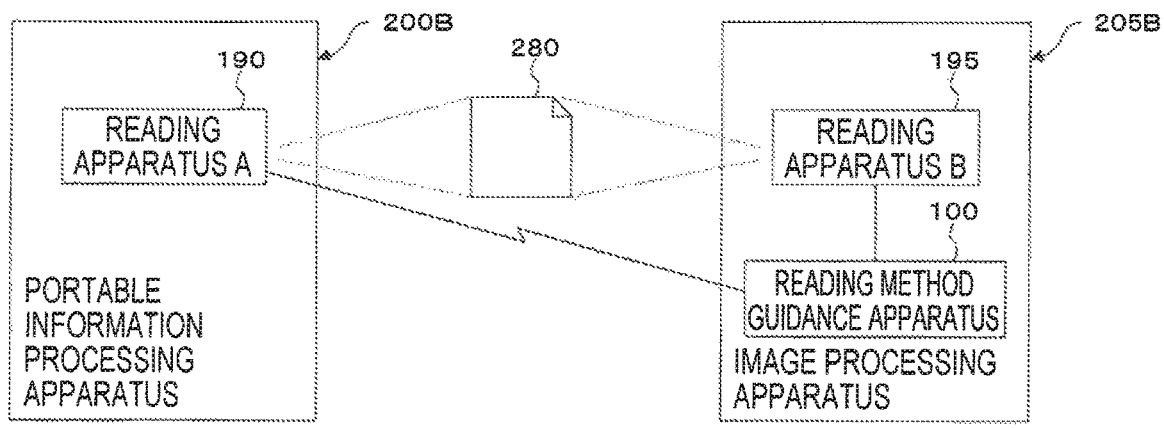

FIGS. 2A and 2B are explanatory views illustrating a system configuration example according to the exemplary embodiment.

The example illustrated in FIG. 2A includes a configuration of a portable information processing apparatus 200A and an image processing apparatus 205A.

The portable information processing apparatus 200A includes the reading method guidance apparatus 100, and the reading apparatus A 190. The reading method guidance apparatus 100 and the reading apparatus A 190 are connected to each other. The image processing apparatus 205A includes the reading apparatus B 195.

The reading apparatus A 190 of the portable information processing apparatus 200A reads (pre-scans) a document 280, and presents a reading procedure on a display of the portable information processing apparatus 200A. The operator views the reading procedure, operates the image processing apparatus 205A, and reads the document 280.

The example illustrated in FIG. 2B includes a configuration of a portable information processing apparatus 200B and an image processing apparatus 205B.

The portable information processing apparatus 200B includes the reading apparatus A 190. The image processing apparatus 205B includes the reading method guidance apparatus 100 and the reading apparatus B 195. The reading method guidance apparatus 100 and the reading apparatus B 195 are connected to each other. The reading apparatus A 190 within the portable information processing apparatus 200B is connected to the reading method guidance apparatus 100 within the image processing apparatus 205B via a communication line.

The reading apparatus A 190 of the portable information processing apparatus 200B reads (pre-scans) the document 280, and transmits the image to the reading method guidance apparatus 100 of the image processing apparatus 205B via a communication line. Then, the reading method guidance apparatus 100 presents a reading procedure on a display of the image processing apparatus 205B. The operator views the reading procedure, operates the image processing apparatus 205B, and reads the document 280.

Figure 3:
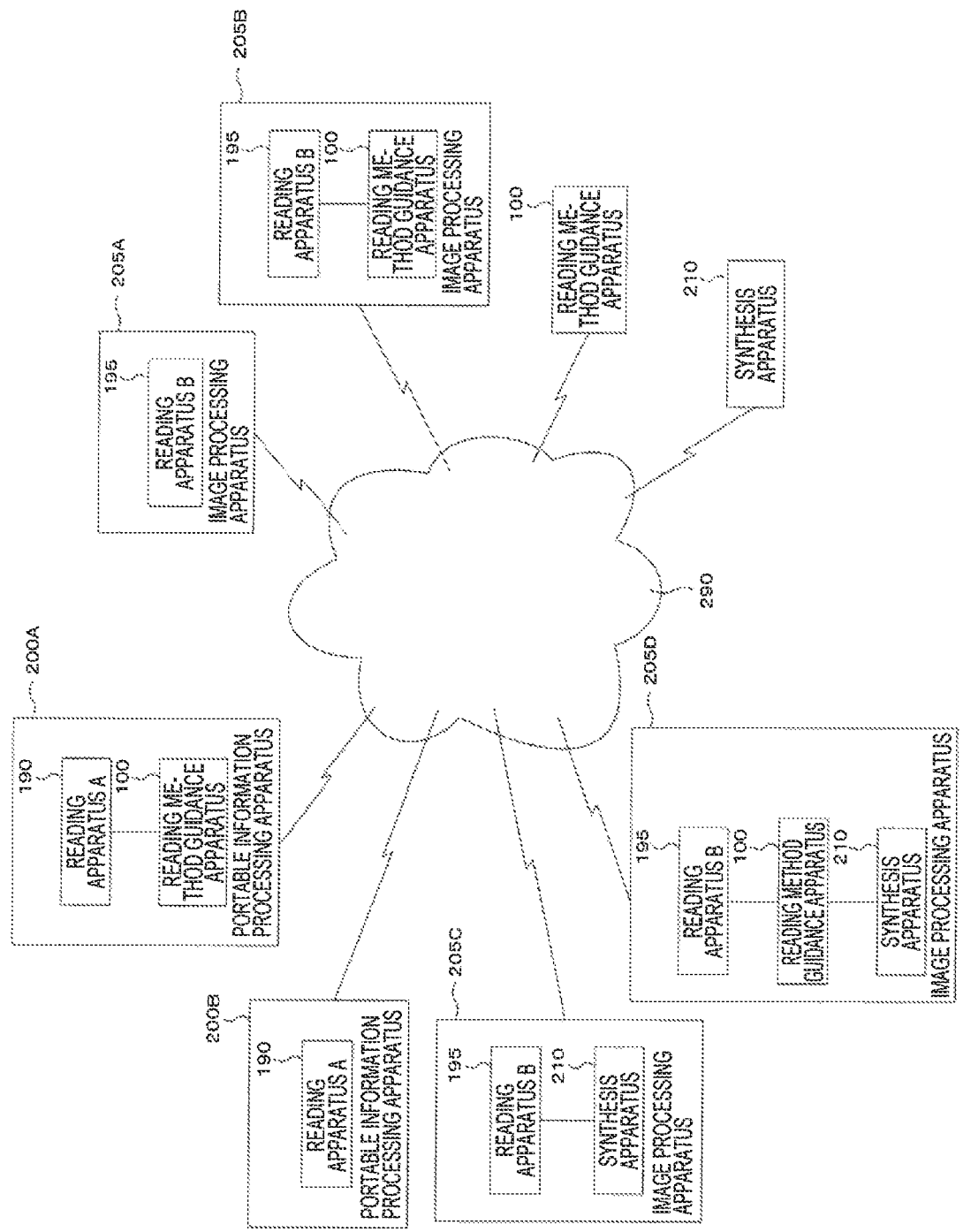
FIG. 3 is an explanatory view illustrating a system configuration example according to the exemplary embodiment.

FIG. 3 is an explanatory view illustrating a system configuration example according to the exemplary embodiment.

The reading method guidance apparatus 100, the portable information processing apparatus 200A, the portable information processing apparatus 200B, the image processing apparatus 205A, the image processing apparatus 205B, an image processing apparatus 205C, an image processing apparatus 205D, and a synthesis apparatus 210 are connected to each other via a communication line 290. The communication line 290 may be wireless, wired or a combination of wireless and wired communication lines, and may be, for example, an intranet, the Internet as a communication infrastructure or the like. Functions by the reading method guidance apparatus 100, and the synthesis apparatus 210 may be implemented as a cloud service. The portable information processing apparatus 200A includes the reading method guidance apparatus 100, and the reading apparatus A 190. The portable information processing apparatus 200B includes the reading apparatus A 190. The image processing apparatus 205A includes the reading apparatus B 195. The image processing apparatus 205B includes the reading method guidance apparatus 100 and the reading apparatus B 195. The image processing apparatus 205C includes the reading apparatus B 195, and the synthesis apparatus 210. The image processing apparatus 205D includes the reading method guidance apparatus 100, the reading apparatus B 195, and the synthesis apparatus 210. The synthesis apparatus 210 synthesizes plural images read by the image processing apparatus 205, and may output the synthesized image. Examples of outputting an image may include printing with a printing device such as a printer, displaying on a display device such as a display, transmitting an image through an image transmission device such as a facsimile, writing an image to an image storage device such as an image database, storing in a storage medium such as a memory card, transferring to another information processing apparatus and the like.

As the synthesis process performed by the synthesis apparatus 210, there has been known, for example, a technique of analyzing respective plural images as synthesis targets to extract a feature amount in an overlapping area and connecting the plural images by aligning the plural images based on the extracted feature amount. In this image processing, if the feature amount in the overlapping area between the plural images is largely changed (for example, a so-called edge portion where a density difference is large), an alignment accuracy is high and the synthesis process is successful. To the contrary, if the feature amount in the overlapping area is minutely changed, the alignment accuracy is small and the synthesis process would fail.

Accordingly, the area to be read redundantly needs to include an area having a feature amount that is largely changed to such an extent that the area can be used in alignment for synthesis. The document size detecting apparatus 100 presents a reading procedure such that an area with a large feature amount change is included in the overlapping area.

For example, through a combination of the portable information processing apparatus 200A, the image processing apparatus 205A, and the synthesis apparatus 210, images which are read in plural batches may be synthesized.

For example, through a combination of the portable information processing apparatus 200B, the image processing apparatus 205B, and the synthesis apparatus 210, images which are read in plural batches may be synthesized.

For example, through a combination of the portable information processing apparatus 200B and the image processing apparatus 205D, images which are read in plural batches may be synthesized.

In the example illustrated in FIGS. 2A and 2B, the reading method guidance apparatus 100 is included in the portable information processing apparatus 200A or the image processing apparatus 205B, but the reading method guidance apparatus 100 may be configured alone. For example, the function of the reading method guidance apparatus 100 may be provided as a cloud service, and the procedure presentation module 135 may present a reading procedure to the portable information processing apparatus 200 or the image processing apparatus 205 used by the operator who causes a document to be read.

For example, through a combination of the portable information processing apparatus 200B, the reading method guidance apparatus 100, and the image processing apparatus 205C, images which are read in plural batches may be synthesized.

As described above, when the image processing apparatus 205 is caused to perform a pre-scan as well, the portable information processing apparatus 200 becomes unnecessary.

FIGS. 4A to 4F are explanatory views illustrating a reading procedure example of a document larger than a readable size.

Portions for alignment used for performing an image synthesis (portions caused to match each other in respective images) need to be present within an area scanned plural times. Thus, the area is limited. The example illustrated in FIGS. 4A to 4F describes a case where a document 400 with an A3 size is read by a scanner having an A4 size as a readable size.

As illustrated in the example of FIG. 4A, it is assumed that the document 400 includes a feature area 402 and a feature area 404 at the upper left and a feature area 406 and a feature area 408 at the lower right, as portions usable for alignment. The feature area 402 or the like is a portion where, for example, edges are dense, and needs to be used for alignment of synthesis.

Here, it is assumed that scanning is performed through a general scanning procedure as illustrated in FIGS. 4B to 4E. That is, at the first time, as illustrated in the example of FIG. 4B, an image of a reading area 410 is acquired by making the upper right of the reading surface and the upper right of the document 400 match each other. At the second time, as illustrated in the example of FIG. 4C, an image of a reading area 420 is acquired by making the upper left of the reading surface and the upper left of the document 400 match each other. At the third time, as illustrated in the example of FIG. 4D, an image of a reading area 430 is acquired by making the lower right of the reading surface and the lower right of the document 400 match each other. At the fourth time, as illustrated in the example of FIG. 4E, an image of a reading area 440 is acquired by making the lower left of the reading surface and the lower left of the document 400 match each other.

Then, the synthesis result of the reading area 410, the reading area 420, the reading area 430, and the reading area 440 is as illustrated in the example of FIG. 4F. However, the feature area 402, the feature area 404, the feature area 406, and the feature area 408 are scanned only once. That is, the feature area 402, the feature area 404, the feature area 406, and the feature area 408 are not included in an overlapping reading area 450 (the cross-shaped portion within FIG. 4F), and thus may not be used for alignment of a synthesis process. Thus, in this scanning procedure, the image quality of a synthesized image 460 (especially, the portion of the overlapping reading area 450) is deteriorated.

Figure 5:
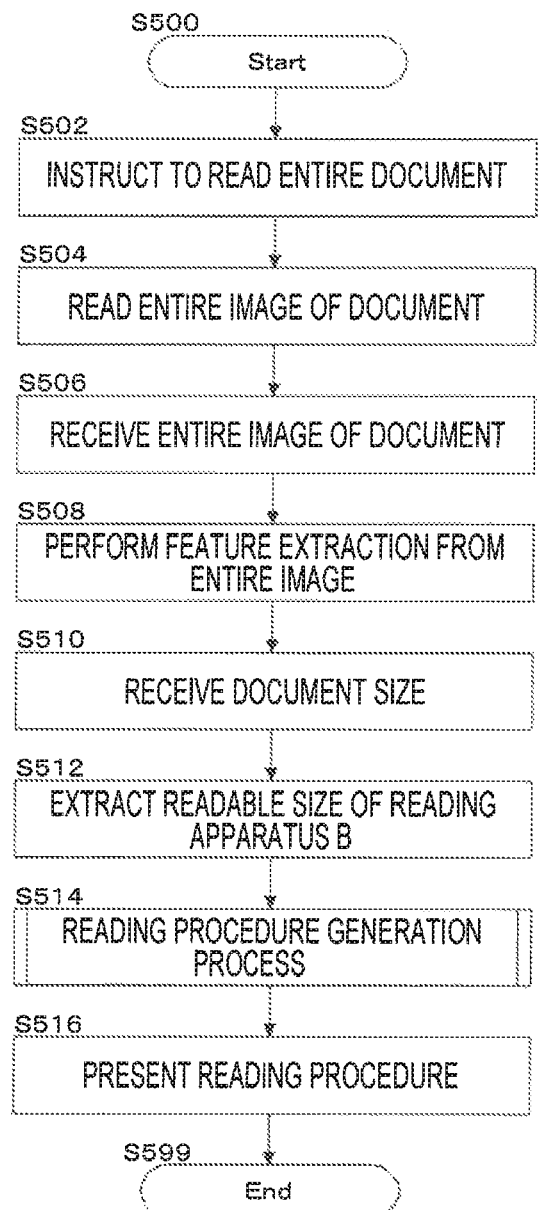
FIG. 5 is a flow chart illustrating a process example according to the exemplary embodiment.

FIG. 5 is a flow chart illustrating a process example according to the exemplary embodiment.

In step S502, the instruction module 140 instructs an operator to read an entire document.

In step S504, the reading apparatus A 190 reads the entire image of the document according to an operation of the operator.

In step S506, the image acquisition module 105 receives the entire image of the document from the reading apparatus A 190.

Figures 6, 7:
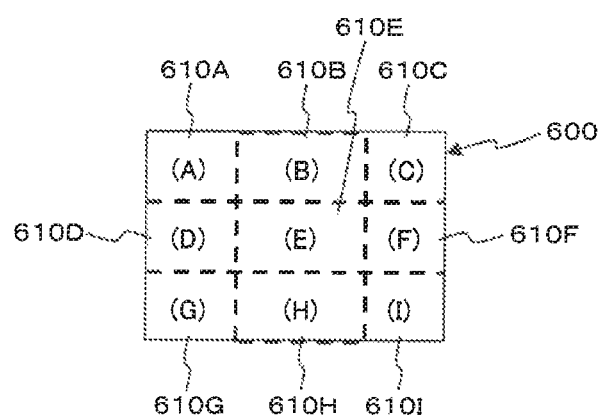
FIG. 6 is an explanatory view illustrating a process example according to the exemplary embodiment.
FIG. 7 is an explanatory view illustrating a data structure example of a reading apparatus and readable size correspondence table.

In step S508, the feature amount extraction module 115 performs a feature extraction from the entire image. For example, as illustrated in FIG. 6, the feature amount extraction module 115 detects a portion having a large feature amount change within an image 600 (a portion usable in alignment in a synthesis process), and detects which one of nine divided areas (areas 610A to 610I) of the image 600 is an area where the portion belongs. Of course, the number of parts into which the image 600 is divided may be any number other than nine, and the sizes of the divided areas may be the same or different.

In step S510, according to an operation of the operator, the document size receiving module 120 receives a document size. For example, the operator designates a document size such as an "A3 size."

In step S512, the readable size extraction module 125 extracts a readable size of the reading apparatus B 195. For example, the reading apparatus and readable size correspondence table 700 is used. FIG. 7 is an explanatory view illustrating a data structure example of the reading apparatus and readable size correspondence table 700. The reading apparatus and readable size correspondence table 700 includes a reading apparatus column 710 and a readable size column 720. The reading apparatus column 710 stores a model information of the reading apparatus (which may be information which uniquely identifies the reading apparatus). The readable size column 720 stores a readable size in the reading apparatus. In the example of FIG. 7, the first row in the reading apparatus and readable size correspondence table 700 indicates that the readable size in the reading apparatus B 195 is A4. For example, the model information of the reading apparatus B 195 connected to the reading method guidance apparatus 100 may be searched for in the reading apparatus column 710, and the information within the readable size column 720 may be extracted.

The processes insteps S508 to S512 may not be performed in the order illustrated in the example of FIG. 5, but may be performed in parallel.

In step S514, the procedure generation module 130 performs a reading procedure generation process. The detailed process in step S514 will be described below with reference to the flow chart illustrated in the example of FIG. 8 or 15.

In step S516, the procedure presentation module 135 presents a reading procedure to the operator. Then, the operator performs a scanning operation with the reading apparatus B 195 according to the presented reading procedure so that reading is performed plural times, and a synthesized image is generated.

Figure 8:
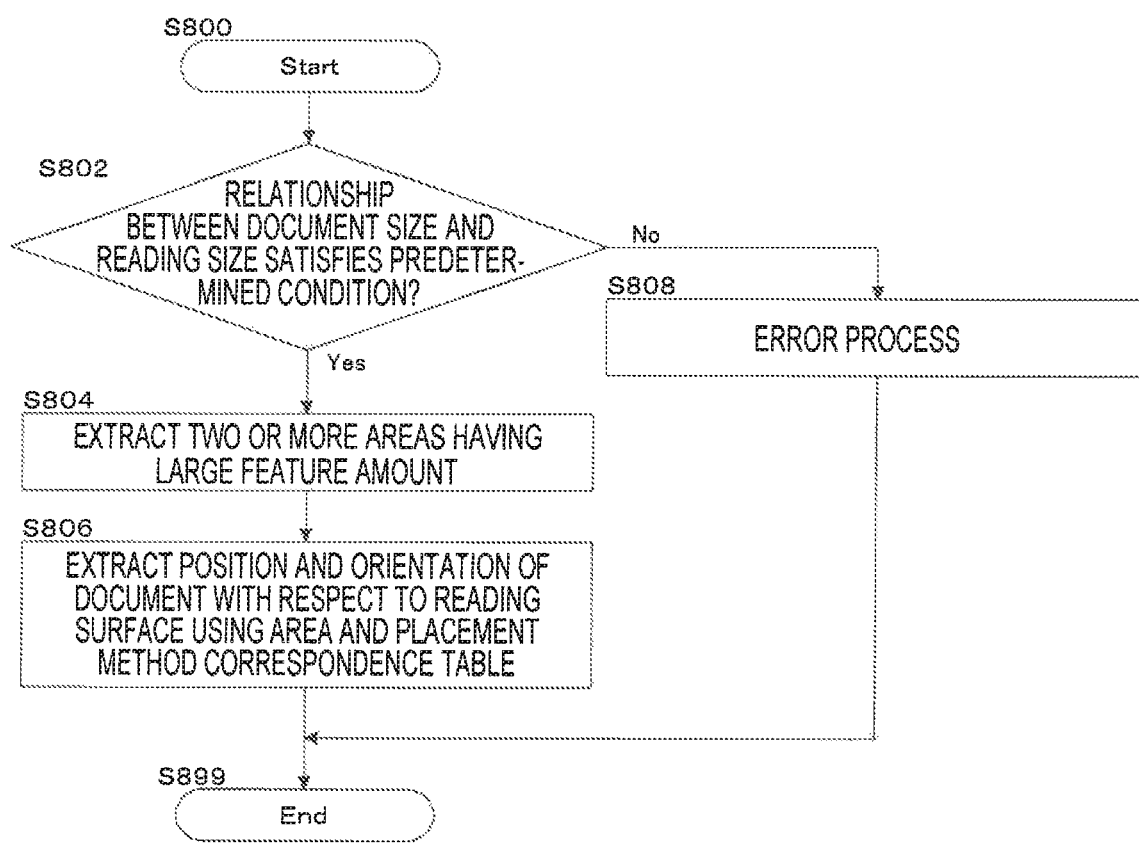
FIG. 8 is a flow chart illustrating a process example according to the exemplary embodiment.

FIG. 8 is a flow chart illustrating a process example according to the exemplary embodiment (mainly, by the procedure generation module 130).

In step S802, it is determined whether or not a relationship between a document size and a reading size satisfies a predetermined condition. When the predetermined condition is satisfied, the process proceeds to step S804, and otherwise, the process proceeds to step S808.

The predetermined condition will be described with reference to the examples illustrated in FIGS. 9A and 9B.

Figure 9A:
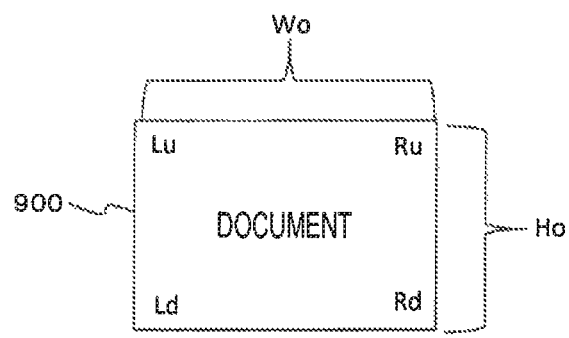
FIGS. 9A and 9B are explanatory views illustrating a process example according to the exemplary embodiment.
Figure 9B:
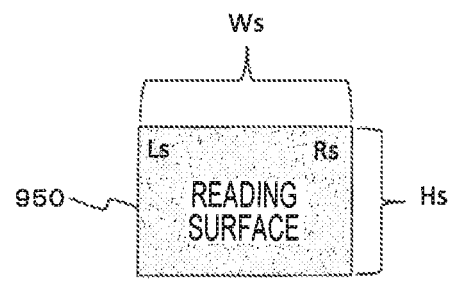

As illustrated in the example of FIG. 9A, the width of a document 900 is Wo, and the height is Ho. Then, the width of a reading surface 950 of a scanner is Ws, and the height is Hs. Here, descriptions will be made on the assumption that the following conditions are satisfied.

$$Wo > Ho \quad (1)$$

$$Ws > Hs \quad (2)$$

That is, there is a relationship in which the size of the document 900 is larger than the size of the reading surface 950. The upper left corner of the document 900 is "Lu," the upper right corner is "Ru," the lower left corner is "Ld," the lower right corner is "Rd," the upper left corner of the reading surface 950 is "Ls," and the upper right corner is "Rs."

Further, conditions for a size relationship between the document 900 and the reading surface 950 are described below.

$$1.5W \geq Wo > Ws \quad (3)$$

$$1.5H \geq Ho > Hs \quad (4)$$

$$Ws \geq Ho \quad (5)$$

$$2Hs \geq Wo \quad (6)$$

For example, in the case of the document 900 with an A3 size, and a scanner having the reading surface 950 with an A4 size, Ws=297, Hs=210, Wo=420, and Ho=297, and thus, 1.41Ws=Wo, 1.41Hs=Ho, Ws=Ho, and 2Hs=Wo. This satisfies the above described conditions.

When these conditions are satisfied, as illustrated in the example of FIGS. 10A to 10F, there are six placement methods (a positional relationship of the document 900 with respect to the reading surface 950).

Placement method 1 (FIG. 10A): Lu of the document 900 is aligned with Ls of the reading surface 950.

Placement method 2 (FIG. 10B): Ru of the document 900 is aligned with Rs of the reading surface 950.

Placement method 3 (FIG. 10C): Ld of the document 900 is aligned with Rs of the reading surface 950. (the document 900 is rotated by 180 degrees)

Placement method 4 (FIG. 10D): Rd of the document 900 is aligned with Ls of the reading surface 950. (the document 900 is rotated by 180 degrees)

Placement method 5 (FIG. 10E): Ld of the document 900 is aligned with Ls of the reading surface 950. (the document 900 is rotated by 90 degrees clockwise)

Placement method 6 (FIG. 10F): Ru of the document 900 is aligned with Ls of the reading surface 950. (the document 900 is rotated by 270 degrees clockwise)

In step S804, two or more areas with a large feature amount (areas where a feature amount is largely changed) are extracted. Specifically, a feature extraction is performed, and extraction from nine areas illustrated in the example of FIG. 6 is made. For example, sorting may be performed in descending order of feature amounts, and then two upper-ranking areas may be selected, or areas with a feature amount equal to or larger than a predetermined threshold value may be selected.

In step S806, a position and an orientation of a document with respect to the reading surface are extracted using an area and placement method correspondence table 1100. FIG. 11A is an explanatory view illustrating a data structure example of the area and placement method correspondence table 1100. Each row in the area and placement method correspondence table 1100 indicates each placement method illustrated in each of the examples of FIGS. 10A to 10F, and each column in the area and placement method correspondence table 1100 indicates each area within an image 1150 illustrated in the example of FIG. 11B (the same as the image 600 illustrated in the example of FIG. 6). Then, "○" in each cell indicates that the entire area is read, and "Δ" indicates that a part of the area is read.

Placement methods by which each of the areas extracted in step S804 may be read twice or more are selected for a reading procedure.

For example, when areas having a large feature amount are the A area and the F area, the placement method 1, the placement method 5, the placement method 2, the placement method 4, and the placement method 6 may be selected. This is because the A area may be read plural times by the placement method 1 and the placement method 5 and the F area may be read plural times by the placement method 2, the placement method 4, and the placement method 6.

For example, when areas having a large feature amount are the B area and the C area, the placement method 1, the placement method 2, the placement method 5, and the placement method 6 may be selected. This is because the B area may be read plural times by the placement method 1, the placement method 2, the placement method 5, and the placement method 6 and the C area may be read plural times by the placement method 2 and the placement method 6.

Figure 12:
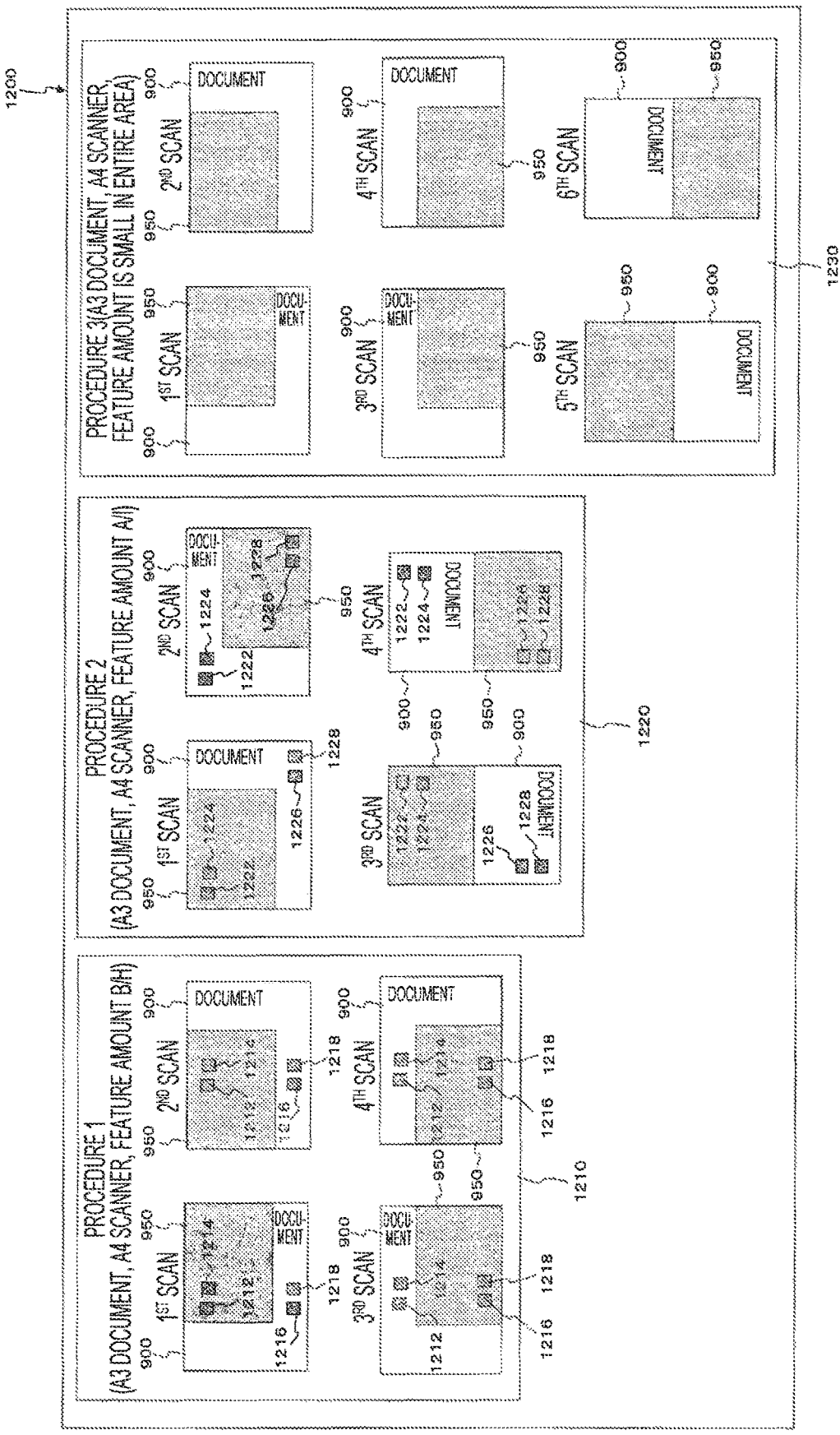
FIG. 12 is an explanatory view illustrating a data structure example of a scanning procedure DB.

In step S806, a reading procedure may be extracted using a scanning procedure DB 1200. FIG. 12 is an explanatory view illustrating a data structure example of the scanning procedure DB 1200. The scanning procedure DB 1200 stores, for example, a procedure 1210, a procedure 1220, a procedure 1230 and the like.

The procedure 1210 stores a reading procedure for a combination of a document with an A3 size, and a scanner having a reading surface with an A4 size, in which areas having a large feature amount are the B area (an area including a feature area 1212 and a feature area 1214) and the H area (an area including a feature area 1216 and a feature area 1218). This reading procedure includes four readings.

The procedure 1220 stores a reading procedure for a combination of a document with an A3 size, and a scanner having a reading surface with an A4 size, in which areas having a large feature amount are the A area (an area including a feature area 1222 and a feature area 1224) and the I area (an area including a feature area 1226 and a feature area 1228). This reading procedure includes four readings.

The procedure 1230 stores a reading procedure for a combination of a document with an A3 size, and a scanner having a reading surface with an A4 size, in which there is no area having a large feature amount. This reading procedure includes six readings.

According to the processing result in step S806, in step S516 of the flow chart illustrated in the example of FIG. 5, one or more of the followings is presented as a reading procedure:
(1) at the time of reading each time, an instruction as to which area on a document is to be read by the reading surface of the scanner in each reading.

Specifically, displaying is performed to indicate an area of the document 900 on the reading surface 950 as illustrated in the examples of FIGS. 10A to 10F;
(2) at the time of reading each time, an instruction as to at which position or in which orientation a document is to be placed on the reading surface of the scanner in each reading.

Specifically, displaying is performed to indicate a positional relationship of the document 900 with respect to the reading surface 950 as illustrated in the examples of FIGS. 10A to 10F;
(3) an instruction on the number of times a document is to be read.

Specifically, the number of placement methods extracted in step S804 corresponds to the number of times a document is to be read; and
(4) after reading at least once or more, an instruction as to whether further reading is required.

Specifically, the number of times of reading is counted, and it is determined whether or not the number of times a document is to be read has been reached. Then, presentation is made as to whether further reading is to be performed.

In step S808, an error process is performed. For example, the reading method guidance apparatus 100 displays that the reading procedure is not presented. The default reading procedure as illustrated in the example of FIGS. 4B to 4E may be presented.

Figure 13:
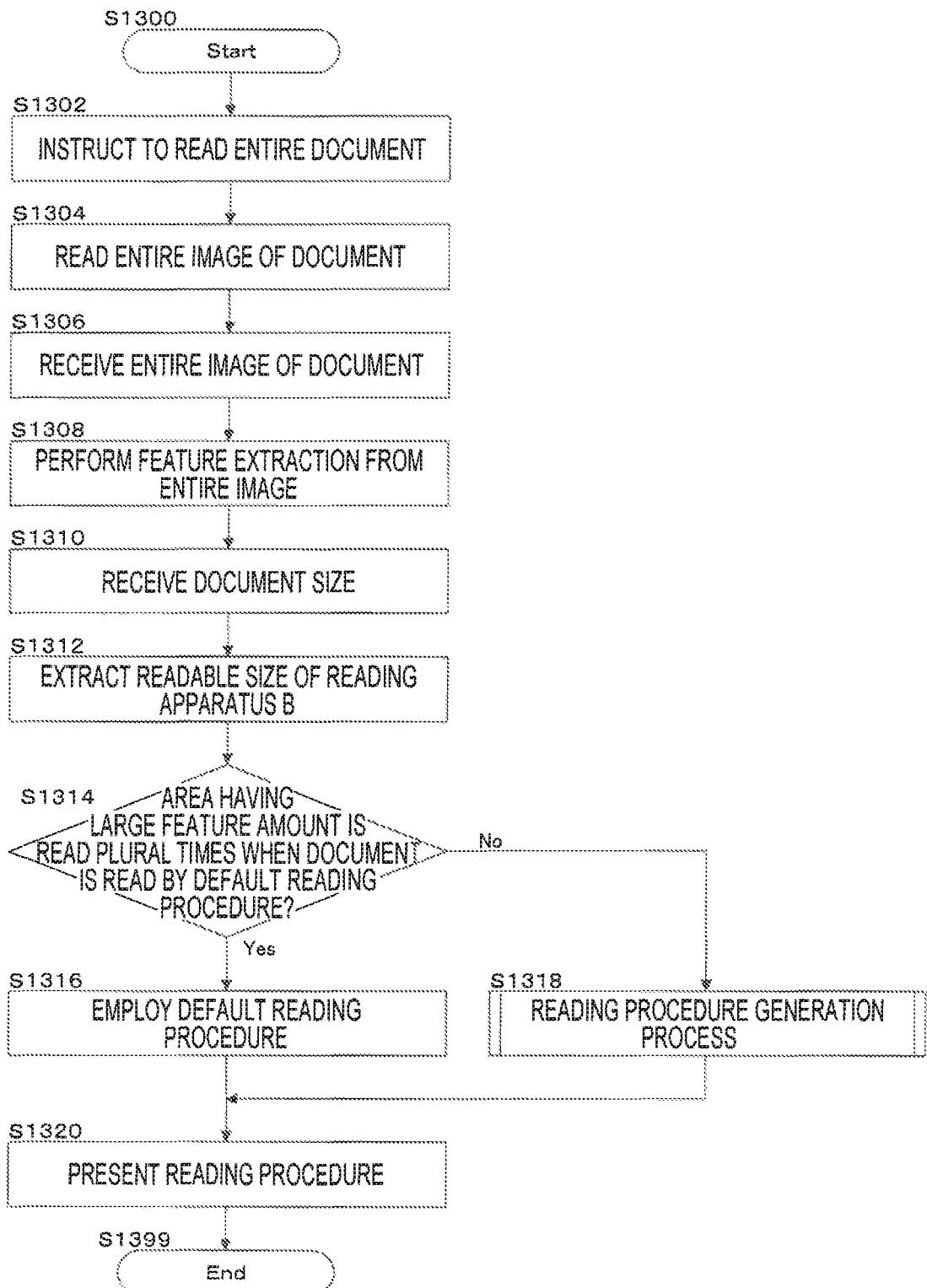
FIG. 13 is a flow chart illustrating a process example according to the exemplary embodiment.

FIG. 13 is a flow chart illustrating a process example according to the exemplary embodiment. The process in steps S1302 to S1312, and the process in steps S1318 to S1320 are the same as the process in steps S502 to S512 and the process in steps S514 to S516 in the flow chart illustrated in the example of FIG. 5.

In step S1302, the instruction module 140 instructs the operator to read an entire document.

In step S1304, the reading apparatus A 190 reads the entire image of the document according to an operation of the operator.

In step S1306, the image acquisition module 105 receives the entire image of the document from the reading apparatus A 190.

In step S1308, the feature amount extraction module 115 performs a feature extraction from the entire image.

In step S1310, according to an operation of the operator, the document size receiving module 120 receives a document size.

In step S1312, the readable size extraction module 125 extracts a readable size of the reading apparatus B 195.

The processes in steps S1308 to S1312 may not be performed in the order illustrated in the example of FIG. 13, but may be performed in parallel.

Figure 14:
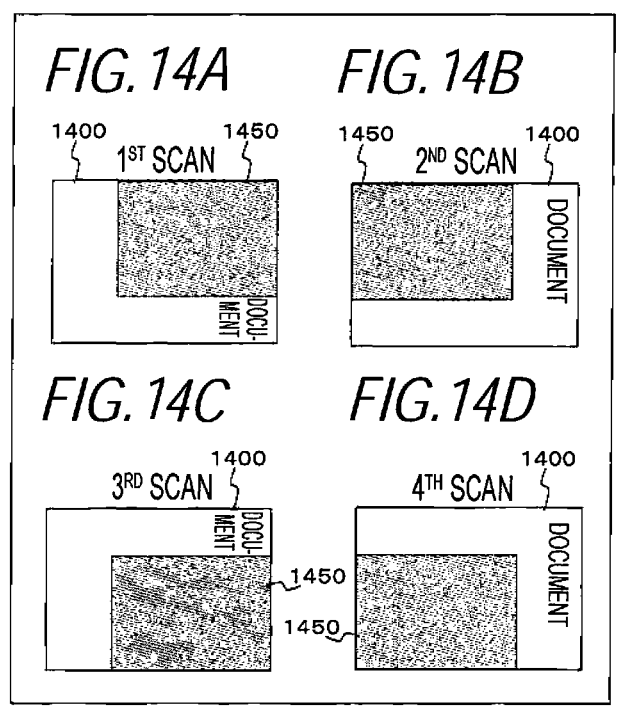
FIGS. 14A to 14D are explanatory views illustrating a process example according to the exemplary embodiment.

In step S1314, it is determined whether or not an area having a large feature amount is read plural times when the document is read by a default reading procedure. When the area is read plural times, the process proceeds to step S1316, and otherwise, the process proceeds to step S1318. As the default reading procedure, for example, the reading procedure illustrated in FIGS. 14A to 14D may be exemplified. Specifically, in the reading procedure, at the first reading, the reading is performed by aligning the upper right side of a reading surface 1450 with the upper right side of a document 1400 as illustrated in the example of FIG. 14A. At the second reading, the reading is performed by aligning the upper left side of the reading surface 1450 with the upper left side of the document 1400 as illustrated in the example of FIG. 14B. At the third reading, the reading is performed by aligning the lower right side of the reading surface 1450 with the lower right side of the document 1400 as illustrated in the example of FIG. 14C. At the fourth reading, the reading is performed by aligning the lower left side of the reading surface 1450 with the lower left side of the document 1400 as illustrated in the example of FIG. 14D.

In step S1316, the procedure generation module 130 employs the default reading procedure.

In step S1318, the procedure generation module 130 performs a reading procedure generation process, and proceeds to step S1320. The detailed process in step S1318 has been described with reference to the flow chart illustrated in the example of FIG. 8.

In step S1320, the procedure presentation module 135 presents a reading procedure to the operator. Then, the operator performs a scanning operation with the reading apparatus B 195 according to the presented reading procedure so that reading is performed plural times, and a synthesized image is generated.

In the process described with reference to FIG. 8, a reading procedure for plural readings is generated using a position alignment portion (a portion having a large feature amount) for performing a synthesis process. Meanwhile, in the process to be described with reference to FIG. 15, a reading procedure for plural readings is generated using a boundary (a joint, which is a portion having a minute feature amount) where cutting and pasting is performed in the synthesis process.

Figure 15:
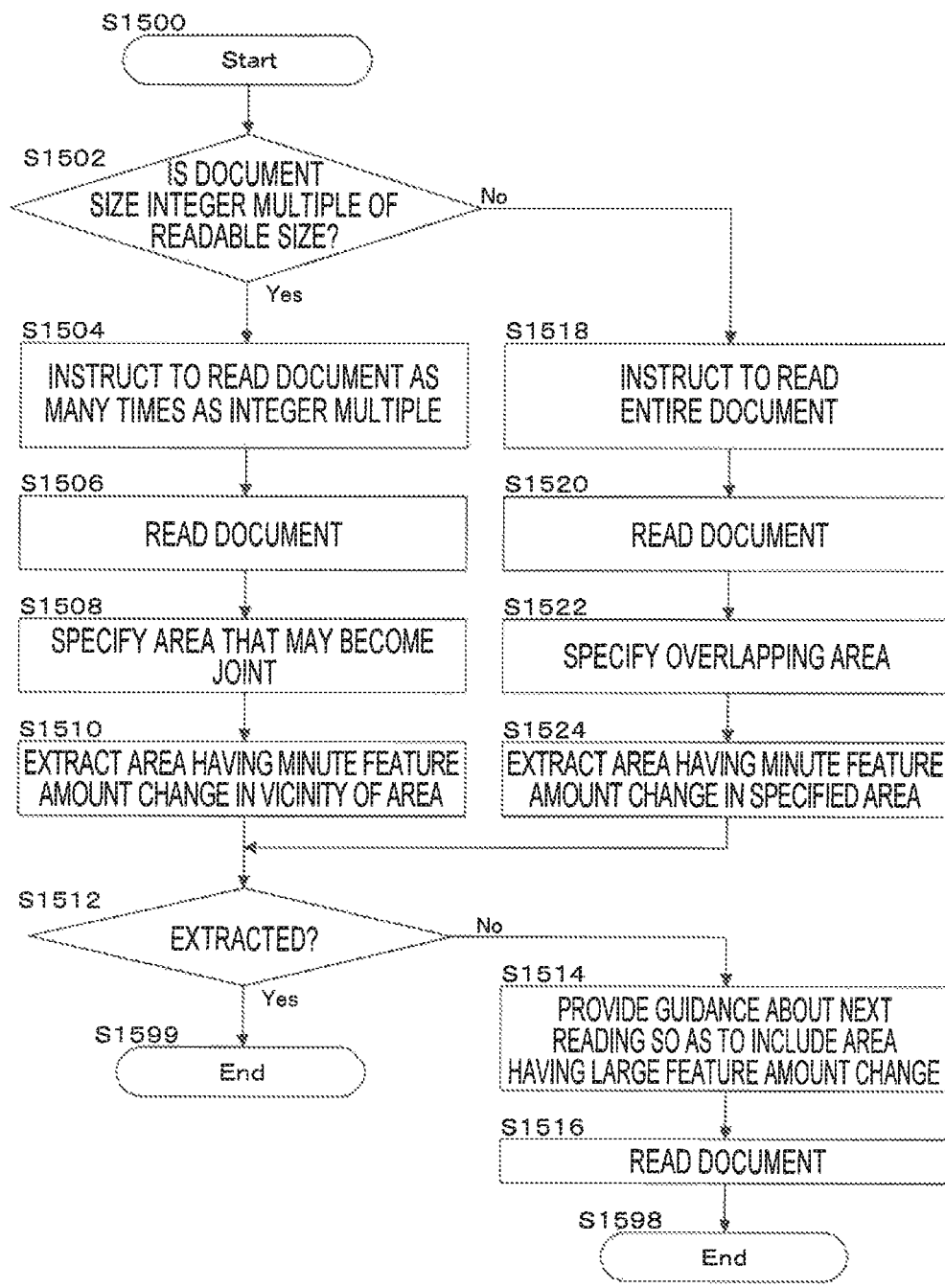
FIG. 15 is a flow chart illustrating a process example according to the exemplary embodiment.

FIG. 15 is a flow chart illustrating a process example according to the exemplary embodiment (mainly by the procedure generation module 130).

In step S1502, it is determined whether or not a document size is an integer multiple of a readable size. When the document size is an integer multiple, the process proceeds to step S1504, and otherwise, the process proceeds to step S1518. The case where the document size is an integer multiple of a readable size indicates that the area size is an integer multiple, which corresponds to the case where, for example, the document size is an A3 size, and the readable size is an A4 size. Another case corresponds to the case where, for example, the document size is a B4 size, and the readable size is an A4 size.

In step S1504, guidance is provided to read a document as many times as the integer multiple.

In step S1506, the document is read.

In step S1508, an area that may become a joint is specified. Specifically, an area below an image read at the first time (an area to which the image continues) and above an image read at the second time (an area continues from the image read at the first time) is an area that may become a joint. Similarly, at the second and subsequent times, an area that may become a joint may be specified.

In step S1510, an area having a minute feature amount change is extracted in the vicinity of the area.

In step S1512, it is determined whether or not the area having a minute feature amount change has been extracted. When the area has been extracted, the process ends (step S1599), and otherwise, the process proceeds to step S1514.

Figure 16:
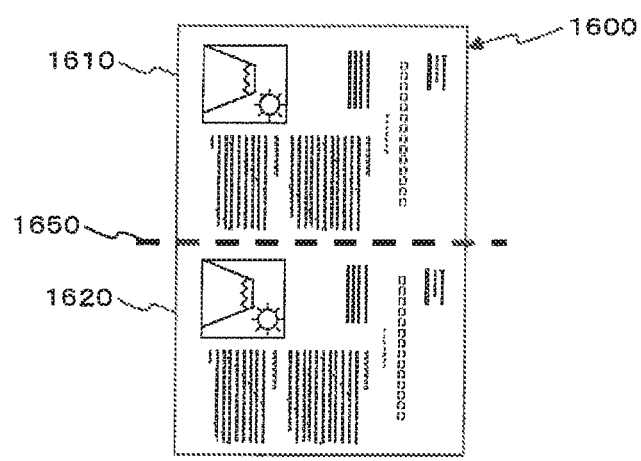
FIG. 16 is an explanatory view illustrating a process example according to the exemplary embodiment.

For example, for a document 1600 illustrated in FIG. 16, reading is performed twice for a reading area 1610 and a reading area 1620. Here, a joint 1650 (which may include a neighboring area including the joint 1650) is blank and is determined as the area having a minute feature amount change. Thus, in step S1512, determination of "Yes" is made and the process ends. Then, in the synthesis process, the reading area 1610 and the reading area 1620 may be synthesized at the joint 1650.

In the process of determining whether or not an area is the area having a minute feature amount change, for example, a histogram may be generated and the area having a minute feature amount change may be extracted. The histogram illustrated in the example of FIG. 18 relates to the joint 1650 of the document 1600 illustrated in the example of FIG. 16, which is a graph in which the horizontal axis indicates a pixel value, and the vertical axis indicates the number of pixels. Since the area is blank, pixel values of pixels in the area are concentrated on one pixel value (one peak). It may be determined that since the graph exceeds a threshold value 1850, the area having a minute feature amount change has been extracted.

Figure 17A:
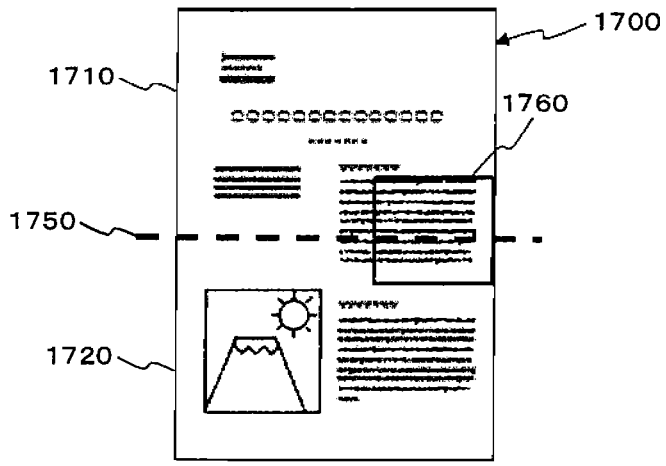
FIGS. 17A to 17C are explanatory views illustrating a process example according to the exemplary embodiment.
Figure 17B:
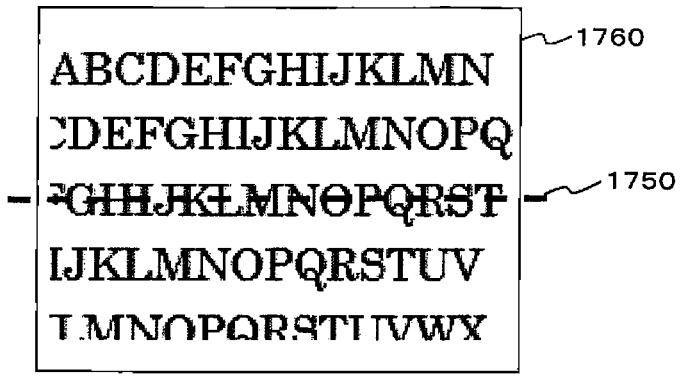
Figure 17C:
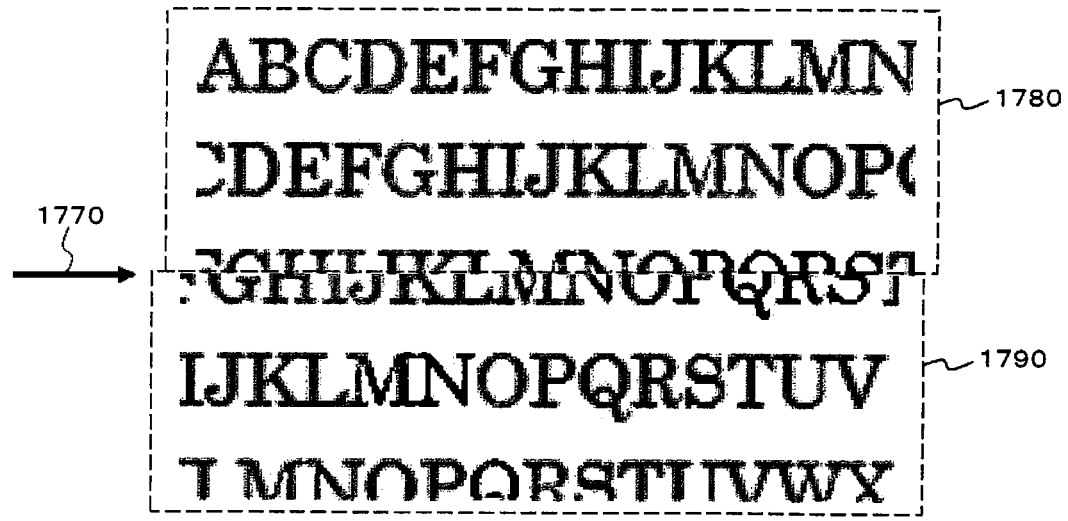

For example, for a document 1700 illustrated in FIG. 17A, reading is performed twice for a reading area 1710 and a reading area 1720. Here, since a character string is described at a joint 1750 (which may include a neighboring area including the joint 1750) and thus an area having a minute feature amount change may not be extracted. For example, at a target area 1760 including the joint 1750, the joint 1750 is present on the character string as illustrated in the example of FIG. 17B. When the process according to the exemplary embodiment is not performed, that is, when the joint 1750 is set as a joint for a synthesis process, a synthesis partial image 1780 and a synthesis partial image 1790 are synthesized at a combining position 1770 as illustrated in the example of FIG. 17C. Thus, a shift occurs at the combining position 1770 on the image of the character string, thereby deteriorating the image quality in the vicinity of the combining position 1770.

Figure 19:
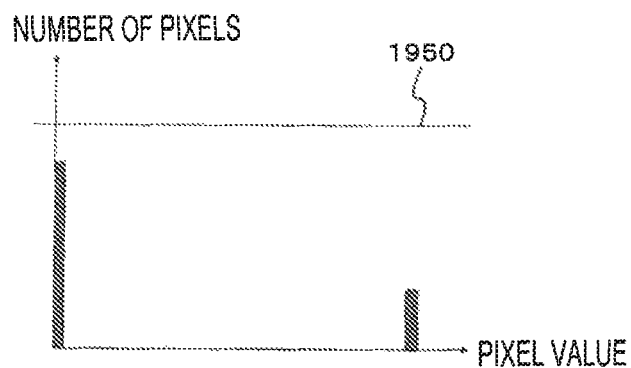
FIG. 19 is an explanatory view illustrating a process example according to the exemplary embodiment.

A histogram illustrated in the example of FIG. 19 relates to the joint 1750 of the document 1700 illustrated in the example of FIGS. 17A to 17C, which is a graph in which the horizontal axis indicates a pixel value, and the vertical axis indicates the number of pixels. Since a character string is included, pixel values of pixels in the area are concentrated on two or more pixel values (two peaks). It may be determined that since the graph does not exceed a threshold value 1950, the area having a minute feature amount change has not been extracted.

In step S1514, guidance about the next reading is provided so as to include an area having a large feature amount change.

Figure 20:
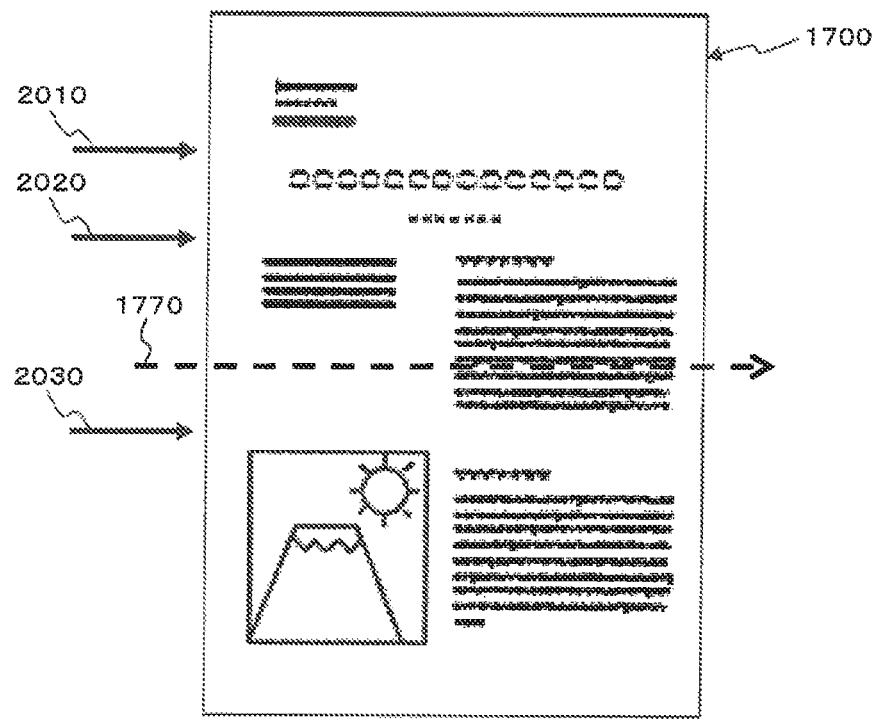
FIG. 20 is an explanatory view illustrating a process example according to the exemplary embodiment.

On the document 1700 illustrated in the example of FIG. 20, since the area having a minute feature amount change has not been extracted at the combining position 1770, the process in step S1514 is performed. Here, the reading area is determined to include the combining position 1770 which is an area having a large feature amount change, and further include an area having a minute feature amount change, which may become a joint. As illustrated in the example of FIG. 20, the document 1700 includes a blank area 2010, a blank area 2020, and a blank area 2030, as areas with a minute feature amount change, in the joint direction (a main scanning direction). Therefore, the blank area 2030 closest to the combining position 1770 is selected, and the next reading area is determined to include the combining position 1770 and the blank area 2030.

Figure 21:
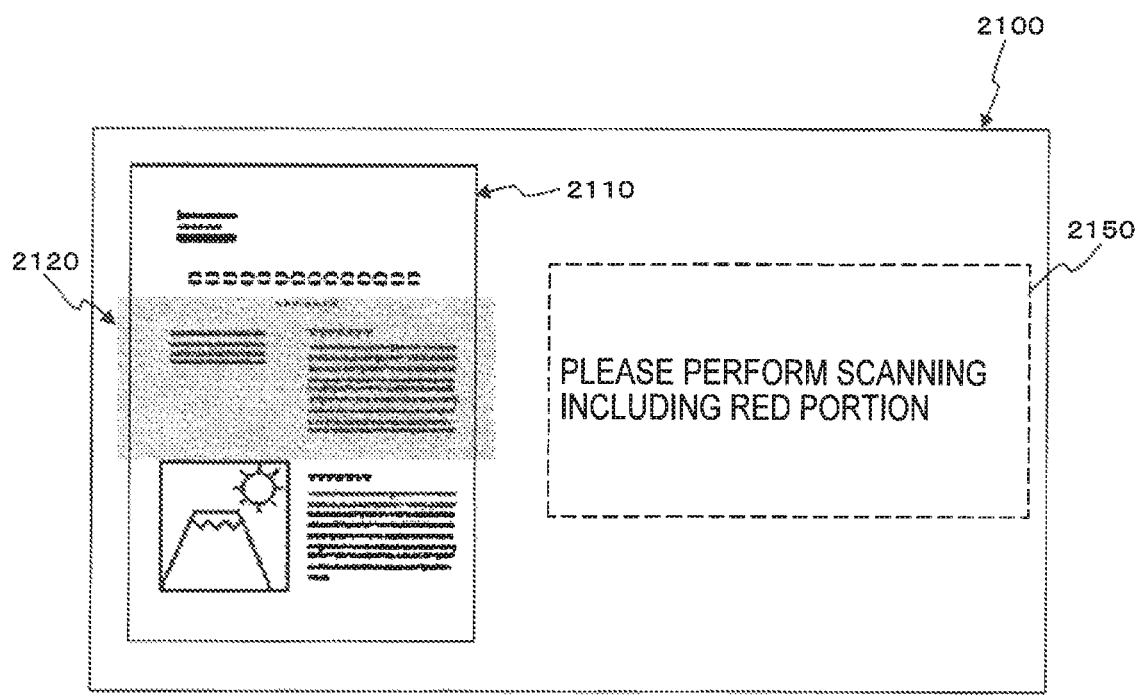
FIG. 21 is an explanatory view illustrating a process example according to the exemplary embodiment.

Then, a presentation as illustrated in the example of FIG. 21 is made. FIG. 21 is an explanatory view illustrating a process example according to the exemplary embodiment. On a screen 2100, a thumbnail image 2110, and a message area 2150 are displayed. Then, on the thumbnail image 2110, a reading area 2120 including the combining position 1770 and the blank area 2030 is displayed. On the message area 2150, for example, a statement "please perform scanning including a red portion (the reading area 2120)" is displayed.

In step S1516, the document is read. For example, the operator performs a scanning operation to cause the reading area 2120 to be read according to the display in FIG. 21.

In step S1518, guidance is provided to read an entire document. Here, the statement "the reading of an entire document" indicates that reading is performed as many times as required for reading the entire document (a quotient obtained by dividing the document size by the readable size, in which decimal figures are rounded up to the nearest greater integer) in order to read a large size document on a small size reading surface.

In step S1520, the document is read.

In step S1522, an overlapping area is specified. Since the area is not an integer multiple, there is an area that has been read repeatedly.

In step S1524, an area having a minute feature amount change is extracted in the specified area, and the process proceeds to step S1512.

Figure 22:
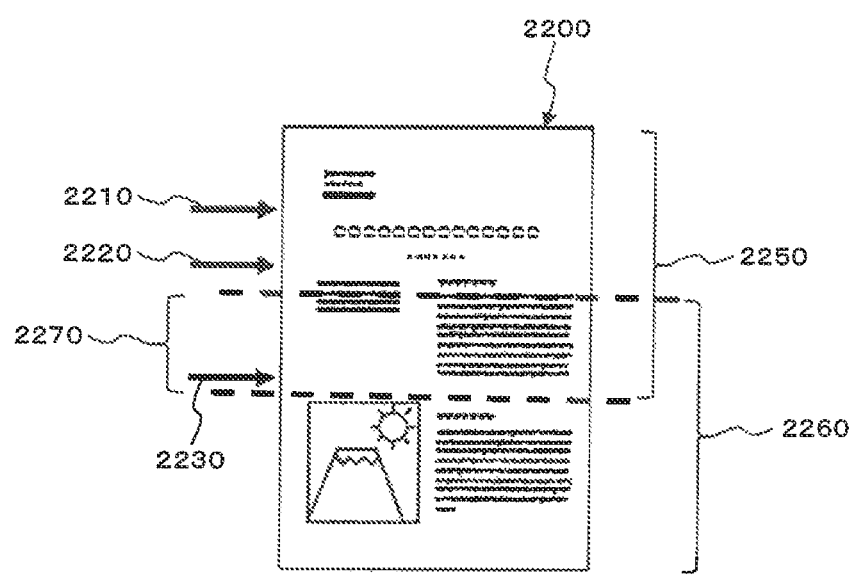
FIG. 22 is an explanatory view illustrating a process example according to the exemplary embodiment.

FIG. 22 is an explanatory view illustrating a process example according to the exemplary embodiment. The example corresponds to a case where the document size is not an integer multiple of the readable size. For example, when a document 2200 has a B4 size and a readable size is an A4 size, a reading area 2250 at the first time and a reading area 2260 at the second time are obtained in step S1520.

Then, in step S1522, an overlapping area 2270 is specified. The overlapping area 2270 is an area read through both the first time reading and the second time reading.

In step S1524, a blank area 2230 is extracted as an area having a minute feature amount change within the overlapping area 2270.

Accordingly, in step S1512, since the blank area 2230 is present within the overlapping area 2270, the process ends with the two readings.

Thereafter, the blank area 2230 within the reading area 2250 at the first time and the blank area 2230 within the reading area 2260 at the second time are coupled to each other to generate a synthesized image.

Figure 23:
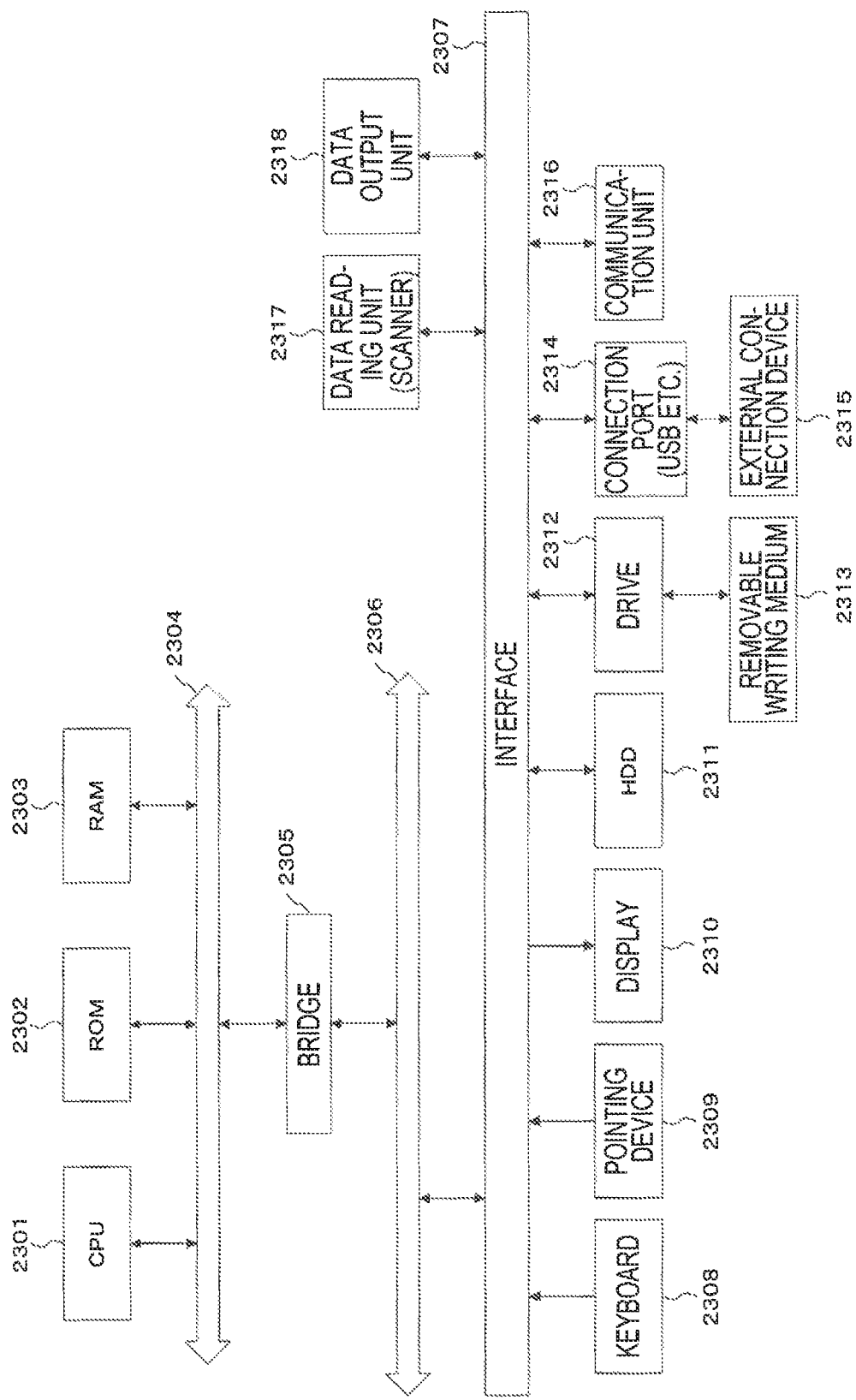
FIG. 23 is a block diagram illustrating a hardware configuration example of a computer that implements the exemplary embodiment.

Descriptions will be made on a hardware configuration example of the reading method guidance apparatus 100 (which may include the portable information processing apparatus 200, the image processing apparatus 205 and the like) according to the exemplary embodiment with reference to FIG. 23. FIG. 23 illustrates a configuration implemented by, for example, a personal computer (PC) or the like, and also illustrates a hardware configuration example including a data reading unit 2317 such as a scanner, and a data output unit 2318 such as a printer.

A central processing unit (CPU) 2301 is a controller that executes a process according to a computer program that describes an execution sequence of each of various modules described in the above described exemplary embodiment, that is, the image acquisition module 105, the guidance module 110, the feature amount extraction module 115, the document size receiving module 120, the readable size extraction module 125, the procedure generation module 130, the procedure presentation module 135, the instruction module 140 and the like.

A read only memory (ROM) 2302 stores programs, operation parameters and the like used by the CPU 2301. A random access memory (RAM) 2303 stores programs used in the execution of the CPU 2301, parameters that properly vary in the execution, and the like. These are connected to each other via a host bus 2304 configured with a CPU bus or the like.

The host bus 2304 is connected to an external bus 2306 such as a peripheral component interconnect/interface (PCI) bus via a bridge 2305.

A keyboard 2308, and a pointing device 2309 such as a mouse are devices operated by an operator. A display 2310 may be a liquid crystal display device, a cathode ray tube (CRT) or the like, and displays various information as text or image information. The display 2310 may be a touch screen or the like which has both functions of the pointing device 2309 and the display 2310. In such a case, in the implementation of a keyboard function, unlike the physical connected keyboard 2308, a keyboard may be drawn on a screen (a touch screen) by software (referred to as a so-called a software keyboard, a screen keyboard or the like) so as to implement the keyboard function.

A hard disk drive (HDD) 2311 incorporates a hard disk (that may be a flash memory or the like), and drives the hard disk to write or reproduce programs or information to be executed by the CPU 2301. The hard disk stores an image read by the reading apparatus A 190 or the reading apparatus B 195, the reading apparatus and readable size correspondence table 700, the area and placement method correspondence table 1100 and the like. Further, the hard disk stores other various data, various computer programs and the like.

A drive 2312 reads data or programs written on a removable recording medium 2313 such as a magnetic disk, an optical disc, a magneto-optical disc, or a semiconductor memory which is mounted thereto, and provides the data or programs to the RAM 2303 connected via an interface 2307, the external bus 2306, the bridge 2305, and a host bus 2304. The removable recording medium 2313 may also be usable as a data writing area.

A connection port 2314 is a port that connects to an external connection device 2315, and includes a connection unit such as a USB, IEEE 1394 or the like. The connection port 2314 is connected to the CPU 2301 and the like via the interface 2307, the external bus 2306, the bridge 2305, the host bus 2304 and the like. A communication unit 2316 is connected to a communication line, and executes a data communication process with the outside. The data reading unit 2317 is, for example, a scanner, and executes a reading process of a document. The data output unit 2318 is, for example, a printer, and executes an outputting process of document data.

The hardware configuration of the reading method guidance apparatus 100 illustrated in FIG. 23 is merely one configuration example, but the exemplary embodiment is not limited to the configuration illustrated in FIG. 23 as long as a configuration where modules described in the exemplary embodiment are executable is employed. For example, some modules may be implemented by dedicated hardware (e.g., an application specific integrated circuit (ASIC) or the like) and some modules may be provided in the external system connected through a communication line. Further, plural systems illustrated in FIG. 23 may be connected to each other through a communication line to cooperate with each other. Especially, the configuration may be incorporated into a portable information device, information appliances, a robot, a copier, a facsimile, a scanner, a printer, a multifunction device or the like as well as the personal computer.

In the comparison process in the description on the above described exemplary embodiment, the statements "equal to or larger than," "equal to or smaller than," "larger than," and "smaller than (less than)" may be replaced with "larger than," "smaller than (less than)," "equal to or greater than," and "equal to or less than," respectively, as long as there is no inconsistency in the combination.

The above described program may be provided while being stored in a recording medium, or may be provided via a communication unit. In such a case, for example, the above described program may be regarded as an invention of "a computer-readable recording medium having a program written therein."

The "computer-readable recording medium having a program written therein" refers to a computer-readable recording medium having a program written therein, which is used for installing, executing, and distributing the program.

Examples of the writing medium may include a digital versatile disc (DVD), e.g., "DVD-R, DVD-RW, DVD-RAM etc." which are standards formulated in a DVD forum, and e.g., "DVD+R, DVD+RW etc." which are standards formulated in DVD+RW, a compact disc (CD), e.g., a read-only memory (CD-ROM), a CD recordable (CD-R), a CD rewritable (CD-RW) etc., a blu-ray (registered mark) disc, a magneto-optical disc (MO), a flexible disc (FD), a magnetic tape, a hard disk, a read only memory (ROM), an electrically erasable programmable read only memory (EEPROM (registered mark)), a flash memory, a random access memory (RAM), a secure digital (SD) memory card and the like.

The whole or a part of the above described program may be stored or distributed while being written on the above described recording medium. Also, the program may be transmitted through a communication, for example, using a wired network or a wireless communication network used for a local area network (LAN), a metropolitan area network (MAN), a wide area network (WAN), the Internet, an intranet, an extranet and the like, or using a transmission medium having a combination of these. Also, the program may be carried on a carrier wave.

Further, the above described program may be a part or the whole of another program, or may be written on a recording medium together with a separate program. Also, the program may be divided and written on plural recording media. In addition, the program may be recorded in any other manner such as compression or encryption as long as it can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading method guidance apparatus comprising:
    a receiving unit that receives a document size that is a size of a document as a reading target;
    an acquisition unit that acquires an image of at least a partial area in the document; and
    a guidance unit that provides an operator with guidance about a reading procedure when the document is read by a first reading apparatus in a plurality of batches, using a feature amount obtained from the acquired image, the received document size, and a readable size that is a size of an area readable by the first reading apparatus,
    wherein, after the acquisition unit reads an area having a feature amount change that is less than a predetermined amount, the guidance unit provides the operator with guidance about a next reading so as to include an area having a feature amount change above the predetermined amount.

2. The reading method guidance apparatus according to claim 1, wherein the reading procedure includes an instruction as to which area on the document is to be read by the first reading apparatus at each reading.

3. The reading method guidance apparatus according to claim 1, wherein the reading procedure includes an instruction as to at which position or in which orientation the document is to be placed on the first reading apparatus at each reading.

4. The reading method guidance apparatus according to claim 1, wherein the reading procedure includes an instruction on the number of times the document is to be read.

5. The reading method guidance apparatus according to claim 1, wherein the reading procedure includes an instruction as to whether or not further reading is required after reading at least once is completed.

6. The reading method guidance apparatus according to claim 1, further comprising:
    an instruction unit that instructs the operator to read the document by the first reading apparatus prior to providing the guidance by the guidance unit,
    wherein the acquisition unit acquires the image of the at least partial area of the document from a result of reading based on the instruction of the instruction unit.

7. The reading method guidance apparatus according to claim 6, wherein the instruction unit instructs the operator to read the document by the first reading apparatus such that a characteristic area in the document falls within the readable area.

8. The reading method guidance apparatus according to claim 1, wherein the acquisition unit acquires the image of the at least partial area of the document by receiving a result obtained by reading an entire area of the document using a second reading apparatus that is different from the first reading apparatus and has a lower reading accuracy than the first reading apparatus.

9. The reading method guidance apparatus according to claim 1, wherein the guidance unit provides guidance as to which area of the document is to be read in each reading such that an area in which the feature amount is locally largely changed on the document is included in reading areas at a time of reading at least twice or more.

10. The reading method guidance apparatus according to claim 9, wherein the guidance unit selects reading patterns whose areas in which the feature amount is locally largely changed overlap, among a plurality of reading patterns whose reading areas overlap each other, for each document size.

11. The reading method guidance apparatus according to claim 10, wherein for each reading pattern, (i) which area of the document is an area to be read a plurality of times and (ii) which area is an area to be read once are specified.

12. The reading method guidance apparatus according to claim 9, wherein the guidance unit changes guidance about the number of times of reading according to a position of the area in which the feature amount is locally largely changed.

13. The reading method guidance apparatus according to claim 9, wherein the guidance unit provides the guidance about the reading procedure such that when there are a plurality of areas in which the feature amount is locally largely changed on the document, the plurality of areas are included in an overlapping area.

14. The reading method guidance apparatus according to claim 1, wherein the guidance unit provides guidance as to which area of the document is to be read in each reading such that an area in which the feature amount is locally minutely changed on the document is not included in reading areas at a time of reading at least twice or more.

15. The reading method guidance apparatus according to claim 1, wherein the guidance unit provides guidance as to which area of the document is to be read in each reading such that reading areas at a plurality of readings do not overlap each other with using an area in which the feature amount is locally minutely changed on the document as a boundary.

16. The reading method guidance apparatus according to claim 15, wherein when the document size is an integer multiple of the readable size, the guidance unit specifies an area that is usable as a joint and checks whether or not the feature amount is locally minutely changed around the area.

17. The reading method guidance apparatus according to claim 16, wherein the guidance unit checks the area of the joint after reading is performed the integer number of times.

18. The reading method guidance apparatus according to claim 17, wherein the guidance unit checks the area of the joint after the reading, and provides guidance to end the reading when the feature amount is minutely changed.

19. The reading method guidance apparatus according to claim 17, wherein the guidance unit checks the area of the joint after the reading, and provides guidance to prompt next reading when the feature amount is changed largely.

20. The reading method guidance apparatus according to claim 19, wherein the guidance unit provides guidance such that (i) the next reading includes at least a part of an already read area and (ii) an area including a portion in which the feature amount is locally largely changed becomes a reading area in the part.

21. The reading method guidance apparatus according to claim 16, wherein in the checking of the guidance unit, a determination is made based on an edge amount in a coupling direction, a histogram, a character recognition result, or a combination thereof.

22. The reading method guidance apparatus according to claim 1, wherein when the document size is not an integer multiple of the readable size, the guidance unit provides guidance as to which area of the document is to be read in each reading such that an overlapping reading area at a plurality of readings becomes smaller.

23. The reading method guidance apparatus according to claim 22, wherein the guidance unit checks whether or not an area in which the feature amount is locally minutely changed is included in the overlapping reading area.

24. The reading method guidance apparatus according to claim 23, wherein the guidance unit performs the checking, and provides guidance to end the reading when the area in which the feature amount is locally minutely changed is included.

25. The reading method guidance apparatus according to claim 23, wherein the guidance unit performs the checking, and provides guidance to prompt a next reading when the area in which the feature amount is locally minutely changed is not included.

26. The reading method guidance apparatus according to claim 25, wherein the guidance unit provides guidance such that (i) the next reading includes at least a part of an already read area and (ii) an area including a portion in which the feature amount is locally largely changed becomes a reading area in the part.

27. The reading method guidance apparatus according to claim 23, wherein in the checking of the guidance unit, a determination is made based on an edge amount in a coupling direction, a histogram, a character recognition result, or a combination thereof.

28. A non-transitory computer readable medium storing a program that causes a computer to execute a reading method guidance process, the process comprising:
receiving a document size that is a size of a document as a reading target;
acquiring an image of at least a partial area in the document; and
providing an operator with guidance about a reading procedure when the document is read by a first reading apparatus in a plurality of batches, using a feature amount obtained from the acquired image, the received document size, and a readable size that is a size of an area readable by the first reading apparatus,
wherein, after the acquiring reads an area having a feature amount change that is less than a predetermined amount, the providing provides the operator with guidance about a next reading so as to include an area having a feature amount change above the predetermined amount.

29. An image processing system comprising:
a reading method guidance apparatus;
a first reading apparatus; and
an image synthesis apparatus, wherein
the reading method guidance apparatus includes
a receiving unit that receives a document size that is a size of a document as a reading target,
an acquisition unit that acquires an image of at least a partial area in the document, and
a guidance unit that provides an operator with guidance about a reading procedure when the document is read by the first reading apparatus in a plurality of batches, using a feature amount obtained from the acquired image, the received document size, and a readable size that is a size of an area readable by the first reading apparatus,
wherein, after the acquisition unit reads an area having a feature amount change that is less than a predetermined amount, the guidance unit provides the operator with guidance about a next reading so as to include an area having a feature amount change above the predetermined amount,
the first reading apparatus includes a reading unit that reads the document, and
the image synthesis apparatus includes a synthesis unit that synthesizes a plurality of images read by the first reading apparatus.

* * * * *